United States Patent
Lee et al.

(10) Patent No.: US 12,463,692 B2
(45) Date of Patent: Nov. 4, 2025

(54) RECONFIGURABLE INTELLIGENT SURFACE (RIS)-ASSISTED SENSING

(71) Applicant: QUALCOMM Incorporated, San Diego, CA (US)

(72) Inventors: Hyojin Lee, San Diego, CA (US); Weimin Duan, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 17/930,312

(22) Filed: Sep. 7, 2022

(65) Prior Publication Data

US 2024/0080074 A1    Mar. 7, 2024

(51) Int. Cl.
| | |
|---|---|
| *H04L 12/00* | (2006.01) |
| *H04B 7/06* | (2006.01) |
| *H04B 7/08* | (2006.01) |

(52) U.S. Cl.
CPC .......... *H04B 7/0617* (2013.01); *H04B 7/086* (2013.01); *H04B 7/0891* (2013.01)

(58) Field of Classification Search
CPC .... H04B 7/0617; H04B 7/086; H04B 7/0891; H04B 7/04013; G01S 5/0273; G01S 2013/464; G01S 7/006
USPC ...................................................... 370/329
See application file for complete search history.

(56) References Cited

U.S. PATENT DOCUMENTS

| | | | | |
|---|---|---|---|---|
| 6,028,722 A | * | 2/2000 | Lang ................. | G02B 27/09 |
| | | | | 359/836 |
| 11,770,175 B2 | * | 9/2023 | Dai .................... | H04W 48/12 |
| | | | | 370/315 |

FOREIGN PATENT DOCUMENTS

| | | | | |
|---|---|---|---|---|
| EP | 4262261 A1 | * | 10/2023 | ......... H04B 7/04013 |
| WO | WO-2021207748 A2 | * | 10/2021 | ......... H04L 25/0242 |
| WO | WO-2022121706 A1 | * | 6/2022 | ......... H04B 7/04013 |
| WO | 2022261575 A1 | | 12/2022 | |

OTHER PUBLICATIONS

Aubry A., et al., "RIS-Aided Radar Sensing in N-LOS Environment", 2021 IEEE 8TH International Workshop on Metrology for Aerospace (Metroaerospace), IEEE, Jun. 23, 2021, XP033961328, pp. 277-282, section II, figures 1,2.

(Continued)

*Primary Examiner* — Frantz Coby
(74) *Attorney, Agent, or Firm* — QUALCOMM Incorporated

(57) ABSTRACT

Disclosed are techniques for wireless sensing. In an aspect, a method for reconfigurable intelligent surface (RIS)-assisted sensing performed by a base station (BS) includes configuring one or more reciprocal RIS beam pairs for sensing, wherein each of the one or more reciprocal RIS beam pairs comprises a downlink (DL) beam having a DL angle of departure (DL AoD) from a RIS controlled by a first set of control voltages and an uplink (UL) beam having an UL AoD from the RIS controlled by a second set of control voltages. The BS may send, to the RIS, information identifying the one or more reciprocal RIS beam pairs. The BS may perform monostatic sensing using at least one of the one or more reciprocal RIS beam pairs.

36 Claims, 17 Drawing Sheets

(56) References Cited

OTHER PUBLICATIONS

Buzzi S., et al., "Foundations of MIMO Radar Detection Aided by Reconfigurable Intelligent Surfaces", arXiv:2105.09250v1 [eess.Sp] arxiv.org, Cornell University Library, 201 OLIN Library Cornell University Ithaca, NY 14853, May 19, 2021 (May 19, 2021), XP081966317, pp. 1-14, Abstract, section II, Figure 1.

Cisija E., et al., "Ris-Aided MMwave MIMO Radar System for Adaptive Multi-Target Localization", 2021 IEEE Statistical Signal Processing Workshop (SSP), Jul. 11, 2021, pp. 196-200, XP033962245, DOI: 10.1109/SSP49050.2021.9513781, The whole document.

International Search Report and Written Opinion—PCT/US2023/069711—ISA/EPO—Jan. 19, 2024.

Lu W., et al., "Intelligent Reflecting Surface Deployment in Cooperative Radar Communication System", 2021 IEEE/CIC International Conference on Communications in China (ICCC Workshops), IEEE, Jul. 28, 2021, XP033976776, pp. 48-53, sections I, II, abstract, figure 1.

Partial International Search Report—PCT/US2023/069711—ISA/EPO—Oct. 20, 2023.

Shao X., et al., "Target Sensing with Intelligent Reflecting Surface: Architecture and Performance", arXiv:2201.09091v2 [eess.SP], Arxiv.Org, Cornell University Library, 201, Olin Library Cornell University Ithaca, NY 14853, May 25, 2022, pp. 1-14, XP091216689, Abstract, Section I Introduction.

Zhou H., et al., "Reconfigurable Intelligent Surface for FDD Systems: Design and Optimization", ICC 2022—IEEE International Conference on Communications, May 16, 2022, pp. 2022-2027, XP034167632, Abstract, Section I Introduction, Section II System Model.

\* cited by examiner

RECONFIGURABLE INTELLIGENT SURFACE (RIS)-ASSISTED SENSING

BACKGROUND OF THE DISCLOSURE

1. Field of the Disclosure

Aspects of the disclosure relate generally to wireless sensing.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method includes configuring one or more reciprocal reconfigurable intelligent surface (RIS) beam pairs for sensing, wherein each of the one or more reciprocal RIS beam pairs comprises a downlink (DL) beam having a DL angle of departure (DL AoD) from a RIS controlled by a first set of control voltages and an uplink (UL) beam having an UL AoD from the RIS controlled by a second set of control voltages; sending, to the RIS, information identifying the one or more reciprocal RIS beam pairs; and performing monostatic sensing using at least one of the one or more reciprocal RIS beam pairs.

In an aspect, a method includes sending a first sensing signal; receiving a reflection of the first sensing signal from a target; sending, to a RIS, a second sensing signal; receiving, from the RIS, a reflection of the second sensing signal from the target; and performing monostatic sensing using the first sensing signal, the reflection of the first sensing signal, the second sensing signal, and the reflection of the second sensing signal.

In an aspect, a method of RIS-assisted sensing includes receiving, at a BS, a first signal comprising a reflection of a sensing signal from a second BS off of a RIS; receiving, at the BS, a second signal comprising a reflection of the sensing signal from the second BS off of the RIS and off of a target; and performing bi-static sensing using the first signal and the second signal.

In an aspect, a method of RIS-assisted sensing includes receiving, at a BS, a first signal comprising a first sensing signal from a second BS; receiving, at the BS, a second signal comprising a reflection of the first sensing signal off of a target; receiving, at the BS, a third signal comprising a reflection of a second sensing signal from the second BS off of a RIS; receiving, at the BS, a fourth signal comprising a reflection of the second sensing signal off of the RIS and off of the target; and performing bi-static sensing using the first signal, the second signal, the third signal, and the fourth signal.

In an aspect, a BS includes a memory; at least one transceiver; and at least one processor communicatively coupled to the memory and the at least one transceiver, the at least one processor configured to: configure one or more reciprocal RIS beam pairs for sensing, wherein each of the one or more reciprocal RIS beam pairs comprises a DL beam having a DL AoD from a RIS controlled by a first set of control voltages and an UL beam having an UL AoD from the RIS controlled by a second set of control voltages; send, to the RIS via the at least one transceiver, information identifying the one or more reciprocal RIS beam pairs; and perform monostatic sensing using at least one of the one or more reciprocal RIS beam pairs.

In an aspect, a BS includes a memory; at least one transceiver; and at least one processor communicatively coupled to the memory and the at least one transceiver, the at least one processor configured to: send, via the at least one transceiver, a first sensing signal; receive, via the at least one transceiver, a reflection of the first sensing signal from a target; send, to a RIS via the at least one transceiver, a second sensing signal; receive, from the RIS via the at least one transceiver, a reflection of the second sensing signal from the target; and perform monostatic sensing using the first sensing signal, the reflection of the first sensing signal, the second sensing signal, and the reflection of the second sensing signal.

In an aspect, a BS includes a memory; at least one transceiver; and at least one processor communicatively coupled to the memory and the at least one transceiver, the at least one processor configured to: receive, via the at least one transceiver, a first signal comprising a reflection of a sensing signal from a second BS off of a RIS; receive, via the at least one transceiver, a second signal comprising a reflection of the sensing signal from the second BS off of the RIS and off of a target; and perform bi-static sensing using the first signal and the second signal.

In an aspect, a BS includes a memory; at least one transceiver; and at least one processor communicatively coupled to the memory and the at least one transceiver, the at least one processor configured to: receive, via the at least one transceiver, a first signal comprising a first sensing signal from a second BS; receive, via the at least one transceiver, a second signal comprising a reflection of the first sensing signal off of a target; receive, via the at least one transceiver, a third signal comprising a reflection of a second sensing signal from the second BS off of a RIS; receive, via the at least one transceiver, a fourth signal comprising a reflection of the second sensing signal off of the RIS and off of the target; and perform bi-static sensing using the first signal, the second signal, the third signal, and the fourth signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
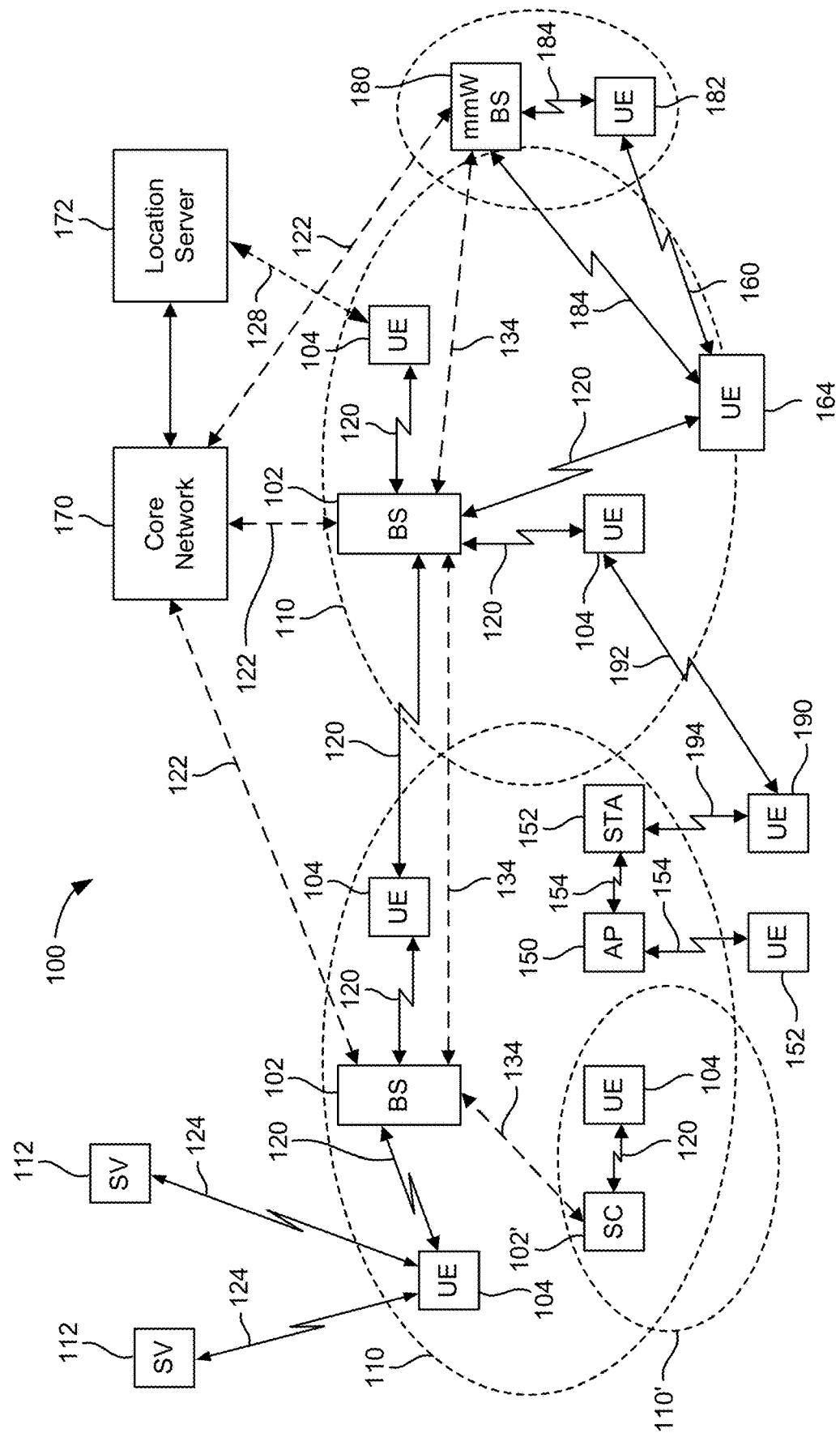
FIG. 1 illustrates an example wireless communications system, according to aspects of the disclosure.

Disclosed are techniques for wireless sensing. In an aspect, a method for reconfigurable intelligent surface (RIS)-assisted sensing performed by a base station (BS) includes configuring at least one reciprocal RIS beam pair for sensing, wherein each reciprocal RIS beam pair comprises a downlink (DL) beam having a DL angle of departure (DL AoD) from the RIS controlled by a first set of control voltages and an uplink (UL) beam having an UL AoD from the RIS controlled by a second set of control voltages; sending, to the RIS, information identifying the at least one reciprocal RIS beam pair; and performing monostatic sensing using at least one of the reciprocal RIS beam pairs.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a SGC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
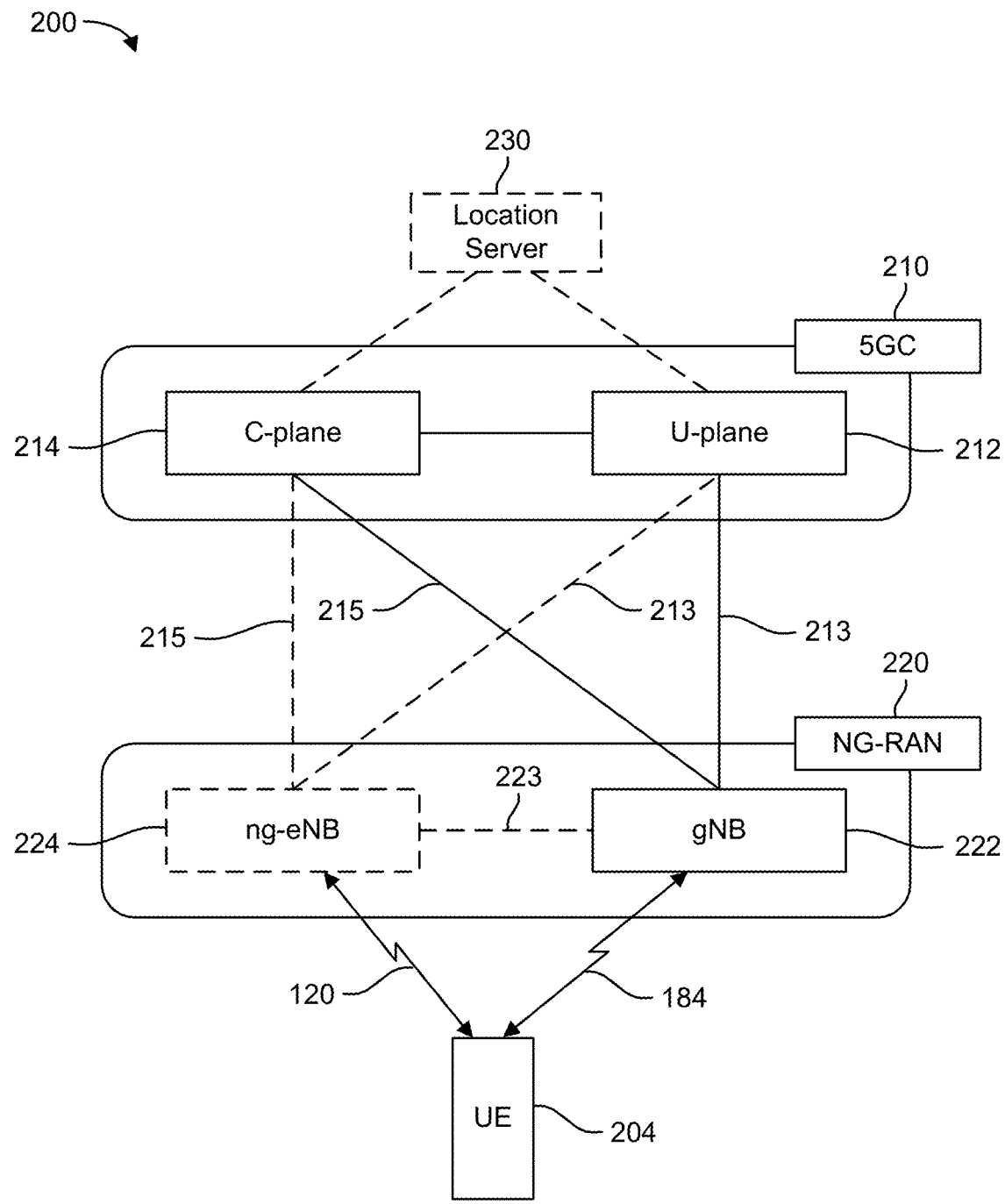
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
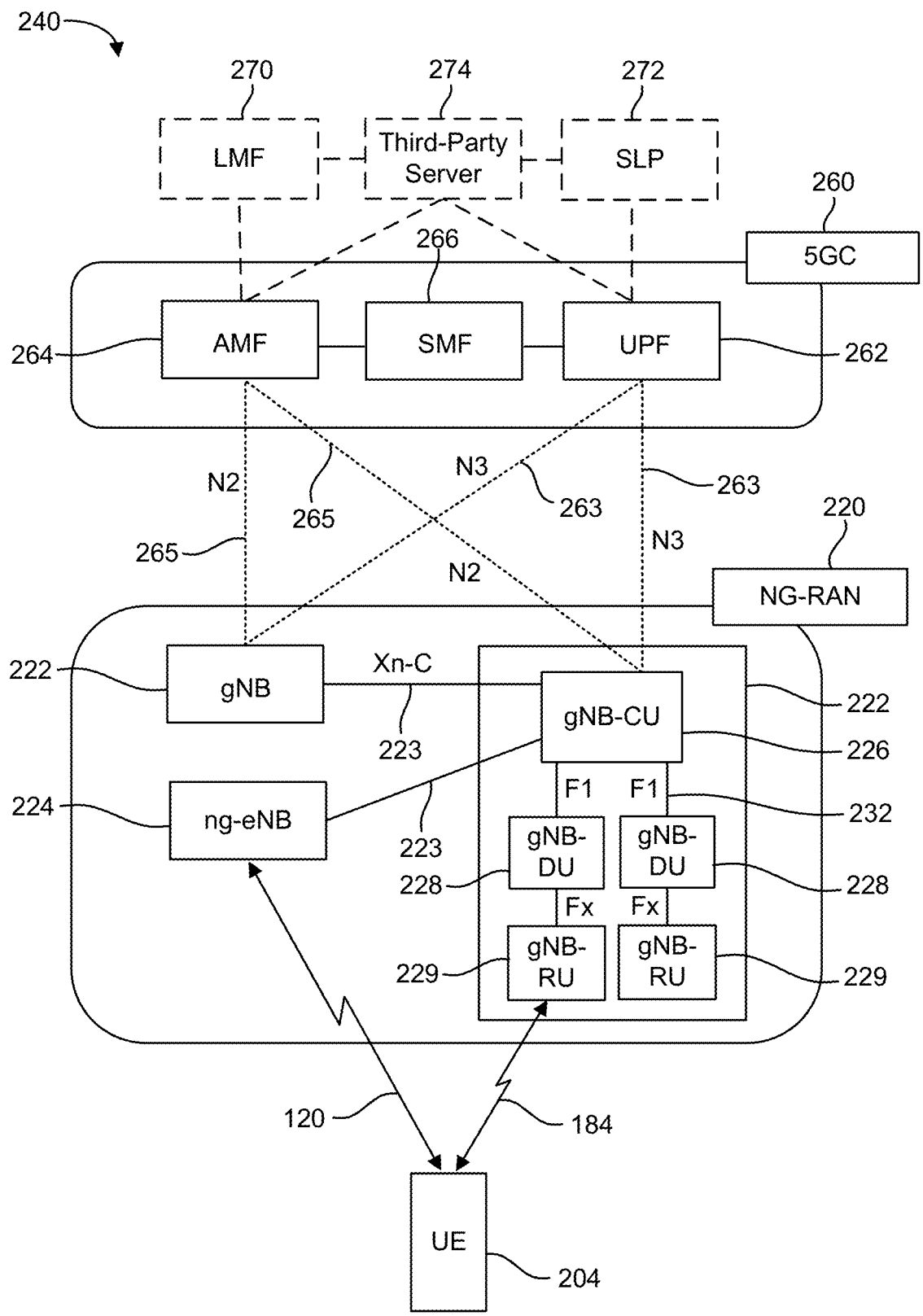

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
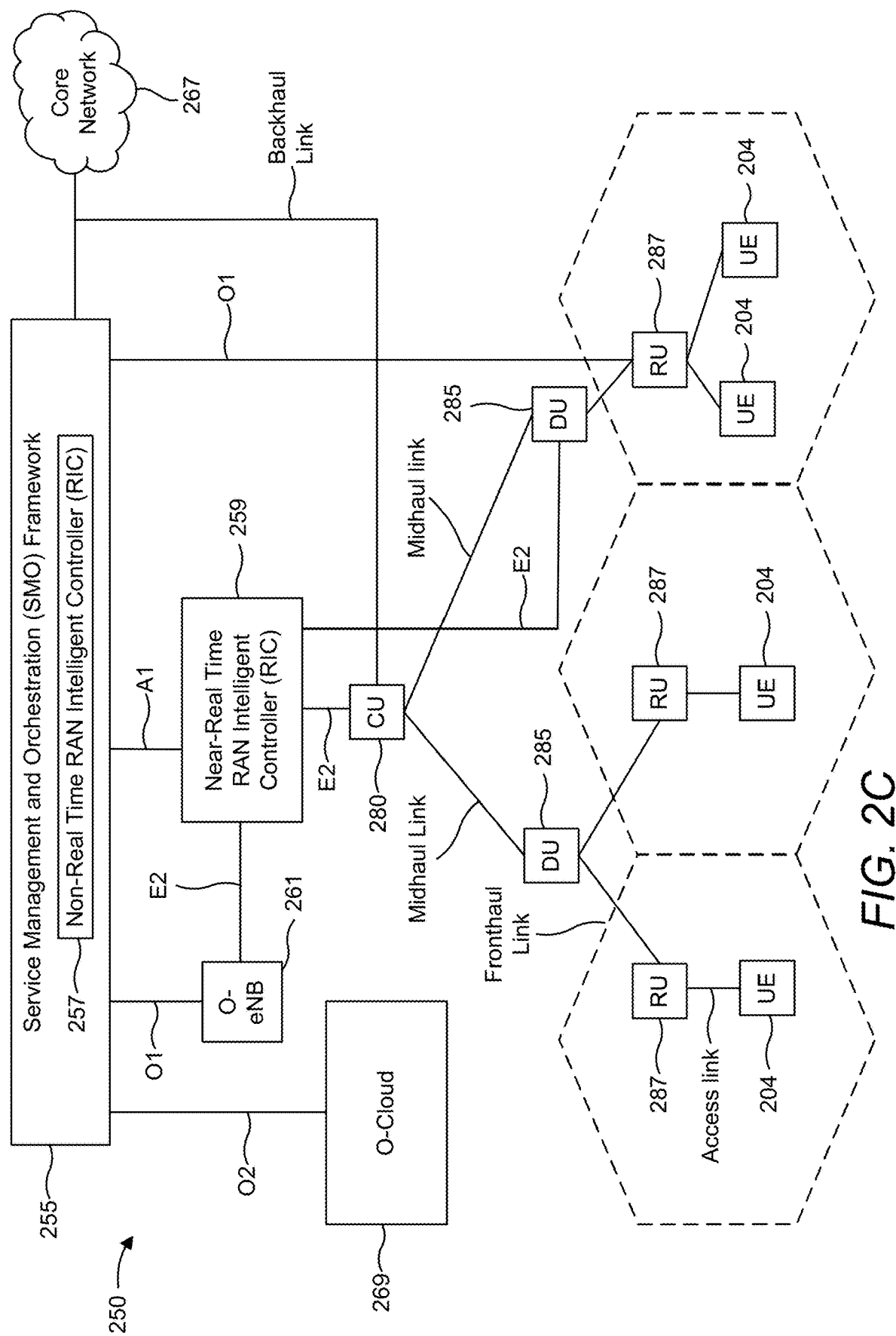

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
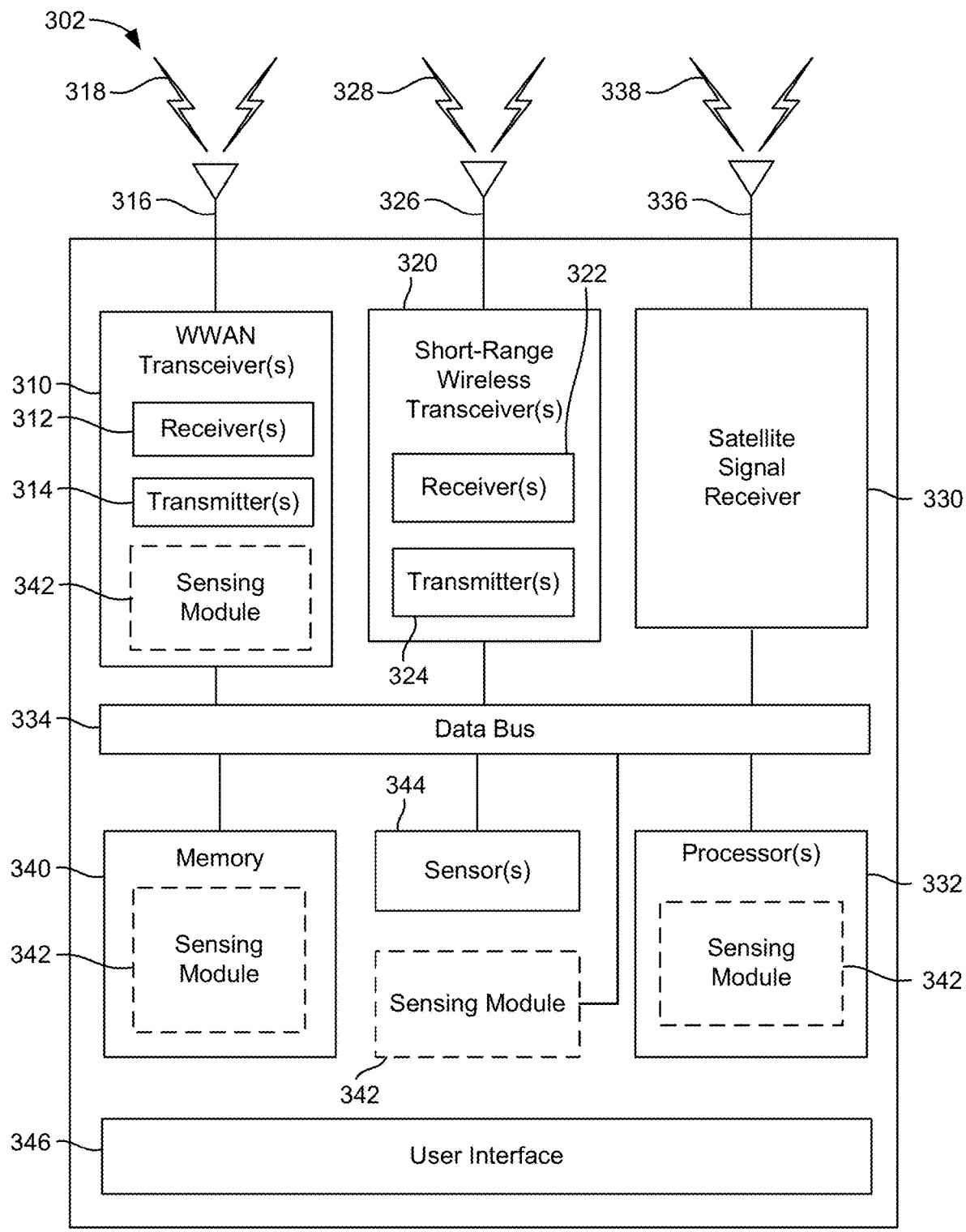
FIGS. 3A, 3B, and 3C are simplified block diagrams of several sample aspects of components that may be employed in a user equipment (UE), a base station, and a network entity, respectively, and configured to support communications as taught herein.
Figure 3B:
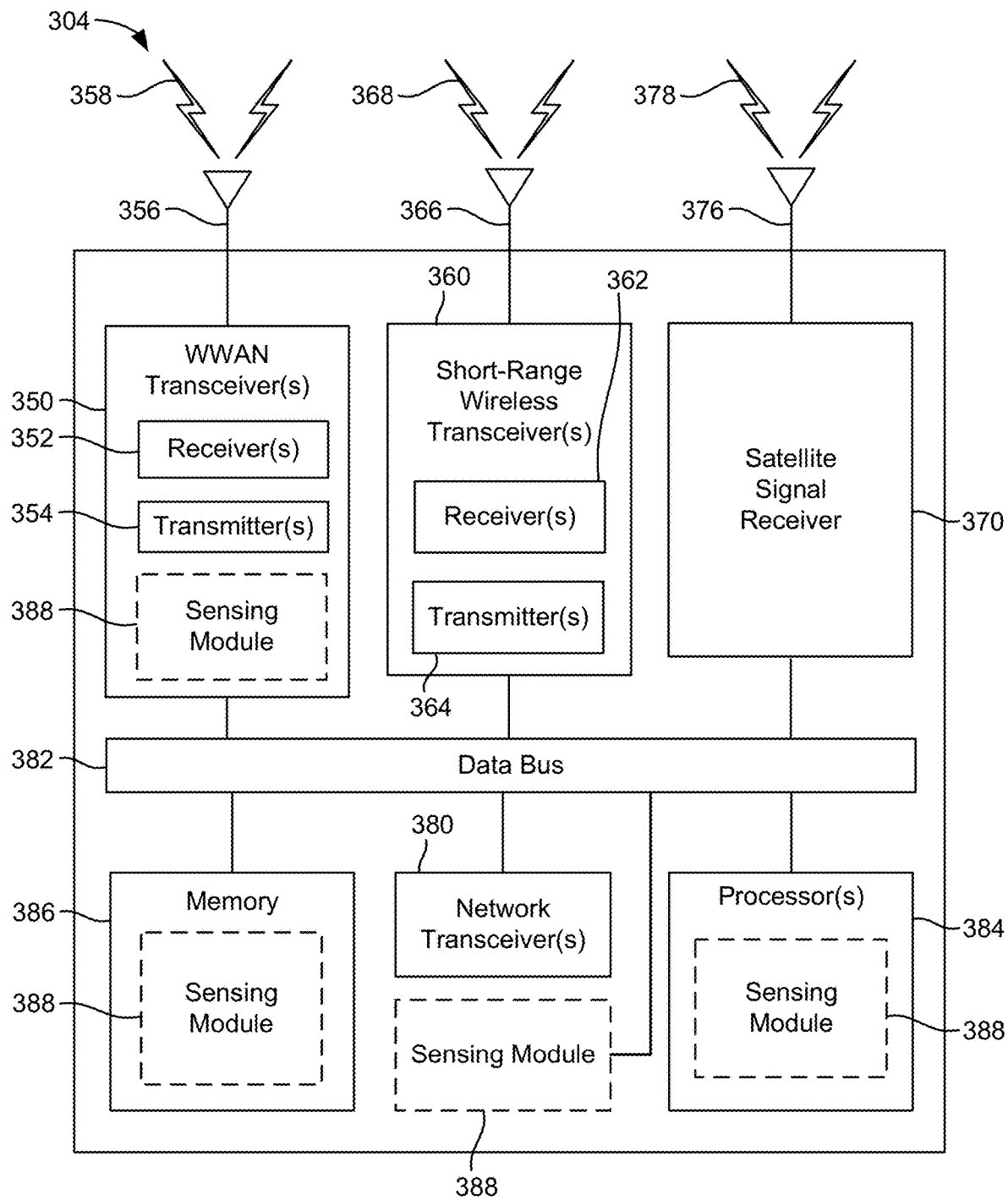
Figure 3C:
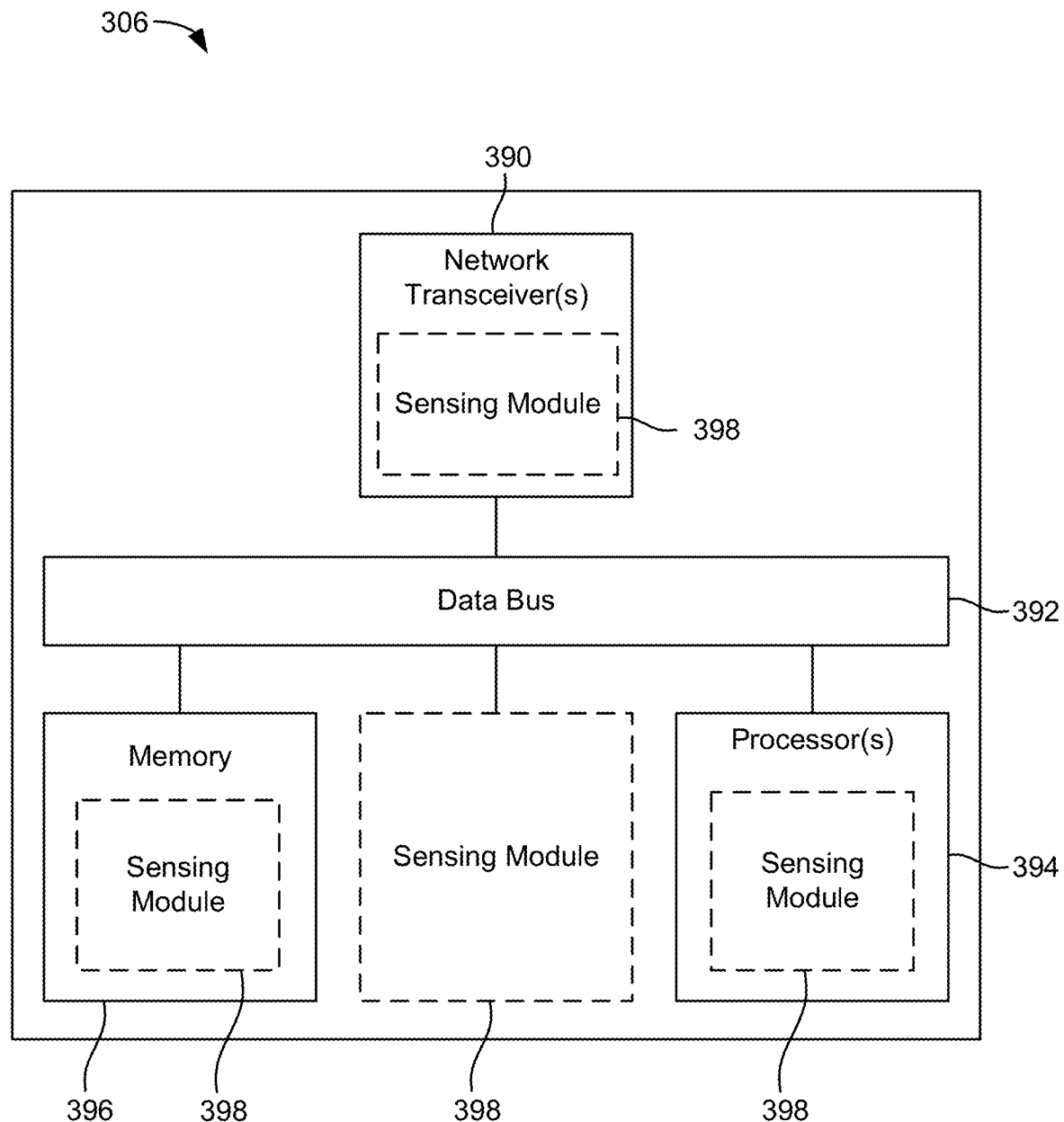

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensing module 342, 388, and 398, respectively. The sensing module 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensing module 342, 388, and 398 may be external to the processors 332, 384, and 394 (e.g., part of a modem processing system, integrated with another processing system, etc.). Alternatively, the sensing module 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensing module 342, which may be, for example, part of the one or more WWAN transceivers 310, the memory 340, the one or more processors 332, or any combination thereof, or may be a standalone component. FIG. 3B illustrates possible locations of the sensing module 388, which may be, for example, part of the one or more WWAN transceivers 350, the memory 386, the one or more processors 384, or any combination thereof, or may be a standalone component. FIG. 3C illustrates possible locations of the sensing module 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensing module 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
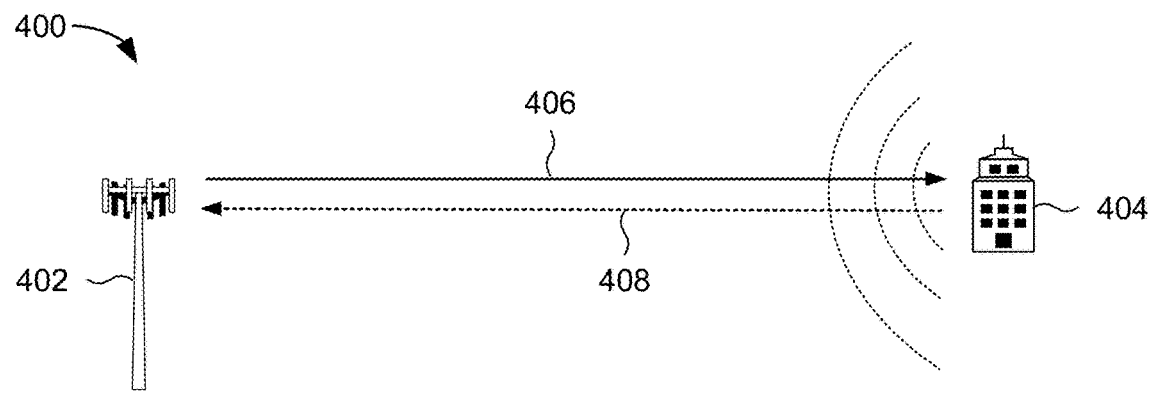
FIG. 4A illustrates an example monostatic radar system.
Figure 4B:
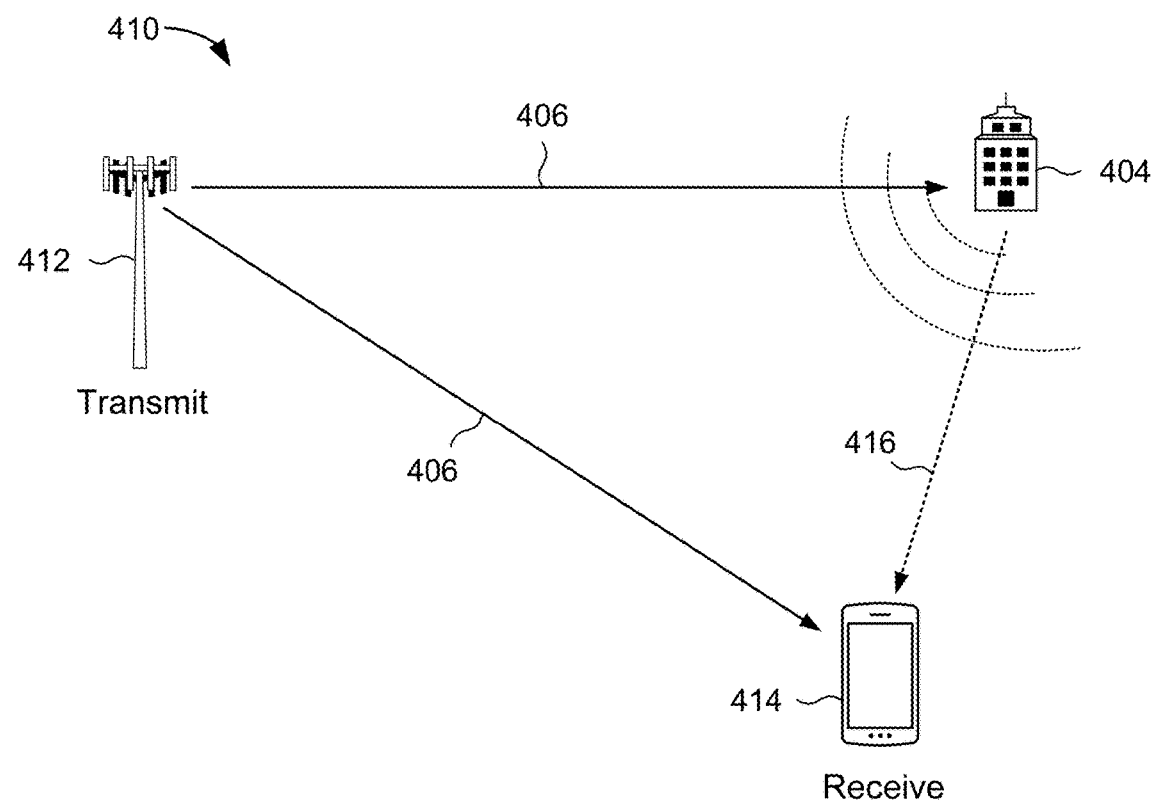
FIG. 4B illustrates an example bistatic radar system.

FIG. 4A and FIG. 4B illustrate two of these various types of radar. In general, there are different types of radar, and in particular, monostatic and bistatic radars. Specifically, FIG. 4A is a diagram 400 illustrating a monostatic radar scenario, and FIG. 4B is a diagram 410 illustrating a bistatic radar scenario.

In FIG. 4A, a base station 402 may be configured for full duplex operation and thus the transmitter (Tx) and receiver (Rx) are co-located. For example, a transmitted radio signal 406 may be reflected off of a target object, such as a building 404, and the receiver on the base station 402 is configured to receive and measure a reflected beam 408. This is a typical use case for traditional, or conventional, radar.

In FIG. 4B, a base station 412 may be configured as a transmitter (Tx) and a UE 414 may be configured as a receiver (Rx). In this example, the transmitter and the receiver are not co-located, that is, they are separated, e.g., by a distance that is comparable to the expected target distance. The base station 412 may be configured to transmit a beam, such as an omnidirectional downlink RF signal 406 which may be received by the UE 414. A portion of the RF signal 406 may be reflected or refracted by the building 404 and the UE 414 may receive this reflected signal 416. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 412 and the receiver is the UE 414, whereas in an uplink scenario, the transmitter is a UE and the receiver is a base station. A multistatic radar system is a generalization of the bistatic radar system, which includes at least three components, e.g., one receiver and two transmitters, two receivers and one transmitter, or multiple receivers and multiple transmitters.

Referring to FIG. 4B in greater detail, the base station 412 transmits RF sensing signals (e.g., PRS) to the UE 414, but some of the RF sensing signals reflect off a target object such as the building 404. The UE 414 can measure the time of arrival (ToA) of the RF signal 406 received directly from the base station, and the ToA of the reflected signal 416 which is reflected from the target object (e.g., the building 404).

The base station 412 may be configured to transmit the single RF signal 406 or multiple RF signals to a receiver (e.g., the UE 414). However, the UE 414 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 412 and the UE 414, and the reflected signal 416 represents the RF sensing signals that followed a NLOS path between the base station 412 and the UE 414 due to reflecting off the building 404 (or another target object). The base station 412 may have transmitted multiple RF sensing signals (not shown in FIG. 4B), some of which followed the LOS path and others of which followed the NLOS path. Alternatively, the base station 412 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 414 can determine the distance to the building 404. In addition, if the UE 414 is capable of receive beamforming, the UE 414 may be able to determine the general direction to the building 404 as the direction of the reflected signal 416, which is the RF sensing signal following the NLOS path as received. The UE 414 may then optionally report this information to the transmitting base station 412, an application server associated with the core network, an external client, a third-party application, or some other entity. Alternatively, the UE 414 may report the ToA measurements to the base station 412, or other entity, and the base station 412 may determine the distance and, optionally, the direction to the target object.

Note that if the RF sensing signals are uplink RF signals transmitted by the UE 414 to the base station 412, the base station 412 would perform object detection based on the uplink RF signals just like the UE 414 does based on the downlink RF signals.

Fifth Generation (5G) massive multiple-input, multiple-output (MIMO) is a key enabler for increasing throughput. High beamforming gain is achieved by using active antenna units (AAUs) and individual radio frequency (RF) chains per antenna ports. However, this results in a significant increase in power consumption due to the use of AAUs.

Figure 5A:
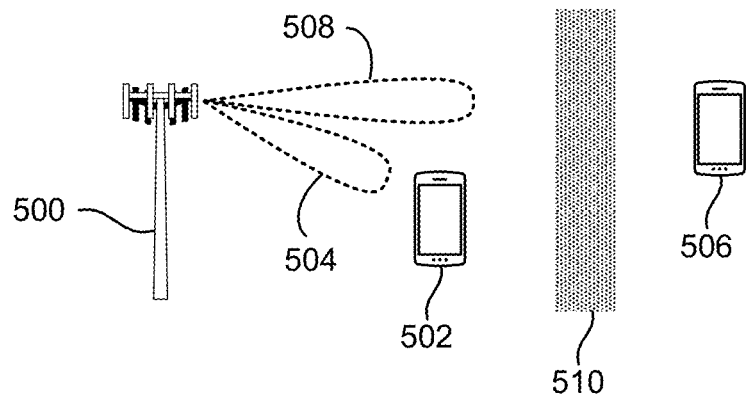
FIGS. 5A and 5B illustrate the use of a reconfigurable intelligent surface (RIS) to extend 5G coverage with negligible power consumption.
Figure 5B:
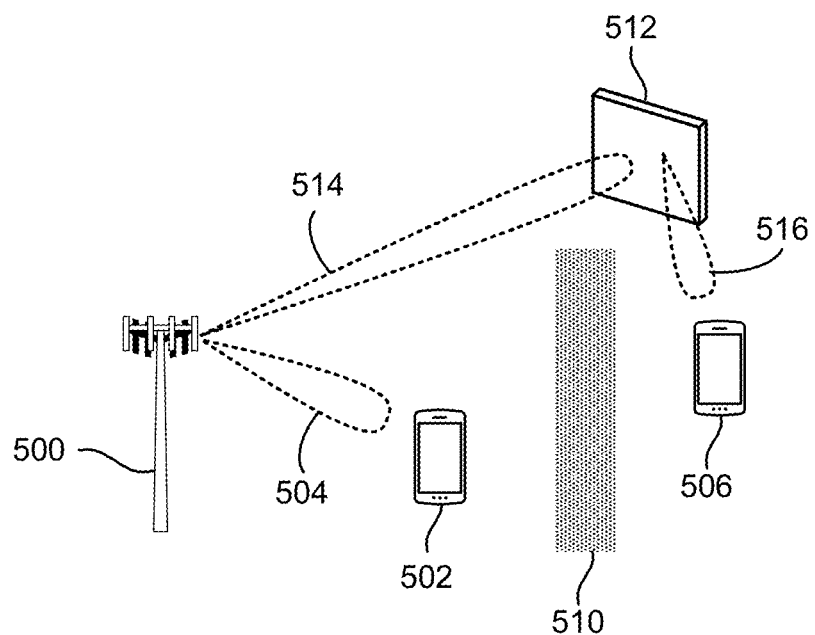

FIGS. 5A and 5B illustrate the use of a reconfigurable intelligent surface (RIS) to extend 5G coverage with negligible power consumption. A RIS is a near-passive device that reflects an impinging wave to a desired direction. The direction may be controlled by a gNB. FIG. 5A illustrates a scenario where a gNB 500 can reach a first UE 502 via a first transmission beam 504, but cannot communicate with a second UE 506 because a second transmission beam 508 transmitted in the direction of the second UE 506 is blocked by an obstacle 510. In FIG. 5B, by using a RIS 512 that is controlled by the gNB 500, the gNB 500 can reach the second UE 506 by transmitting a third beam 514 towards the RIS 512, which sends a reflected beam 516 around the obstacle 510 towards the second UE 506. As detailed below, RIS 512 can be used not only to extend 5G coverage for communication, but also to assist network sensing aspects. Accordingly, techniques for mono-static and bi-static sensing disclosed herein enable the acquisition of accurate target range information utilizing RIS reflection signals.

Figure 6:
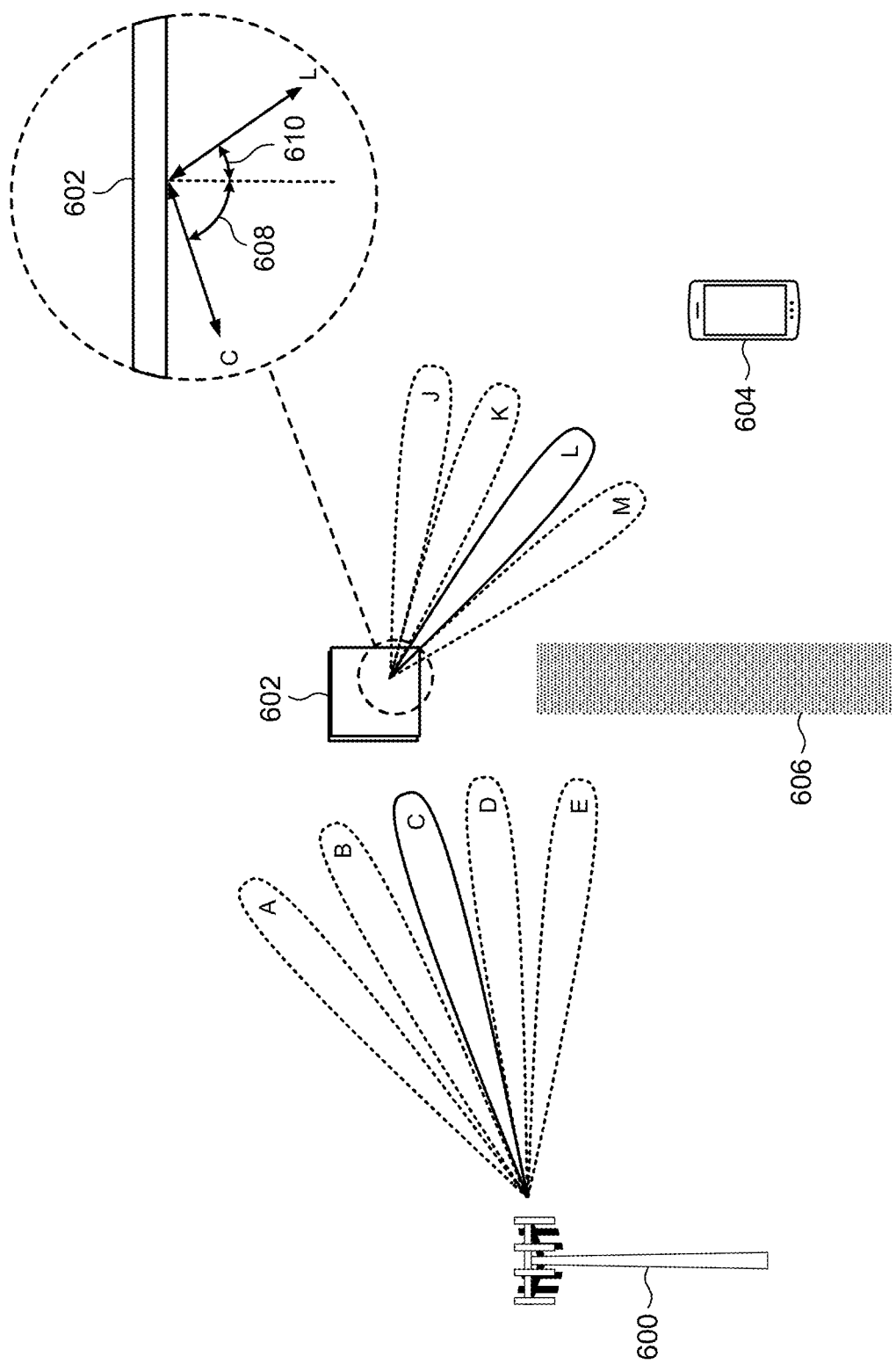
FIG. 6 illustrates an example of the use of a RIS to extend coverage in more detail.

FIG. 6 illustrates an example of the use of a RIS to extend coverage in more detail. The simplified example shown in FIG. 6 involves a gNB 600 and a RIS 602, both of which are in a fixed location, and a mobile UE 604 having no line of sight (LOS) channel to the gNB 600 because of an obstacle 606. In the example shown in FIG. 6, the gNB 600 transmits a series of directional beams labeled A through E. One of the beams—beam C—is aimed towards the RIS 602. The RIS 602 can reflect the incoming beam C at different possible angles, shown as reflected beams labeled J through M. One of the reflection angles—reflected beam L—is aimed towards the UE 604.

The angle 608 from which the RIS 602 receives an incoming beam is called the incident angle, and the angle 610 at which the RIS 602 transmits the reflected beam is called the reflection angle. The RIS 602 has no control over the incident angle, but can control the reflection angle by means of a control voltage set applied to the antenna elements of the RIS 602.

For a DL transmission, such as the one shown in FIG. 6, angle 608 is the incident angle and angle 610 is the reflection angle, but for UL transmission, angle 610 is the incident angle and angle 608 is the reflection angle. In the example illustrated in FIG. 6, the reflection angle for a DL transmission (i.e., angle 610) is not the same angle as the reflection angle for an UL transmission (i.e., angle 608), and thus the control voltage set needed for DL transmission will be different from the control voltage set needed for UL transmission.

Figure 7:
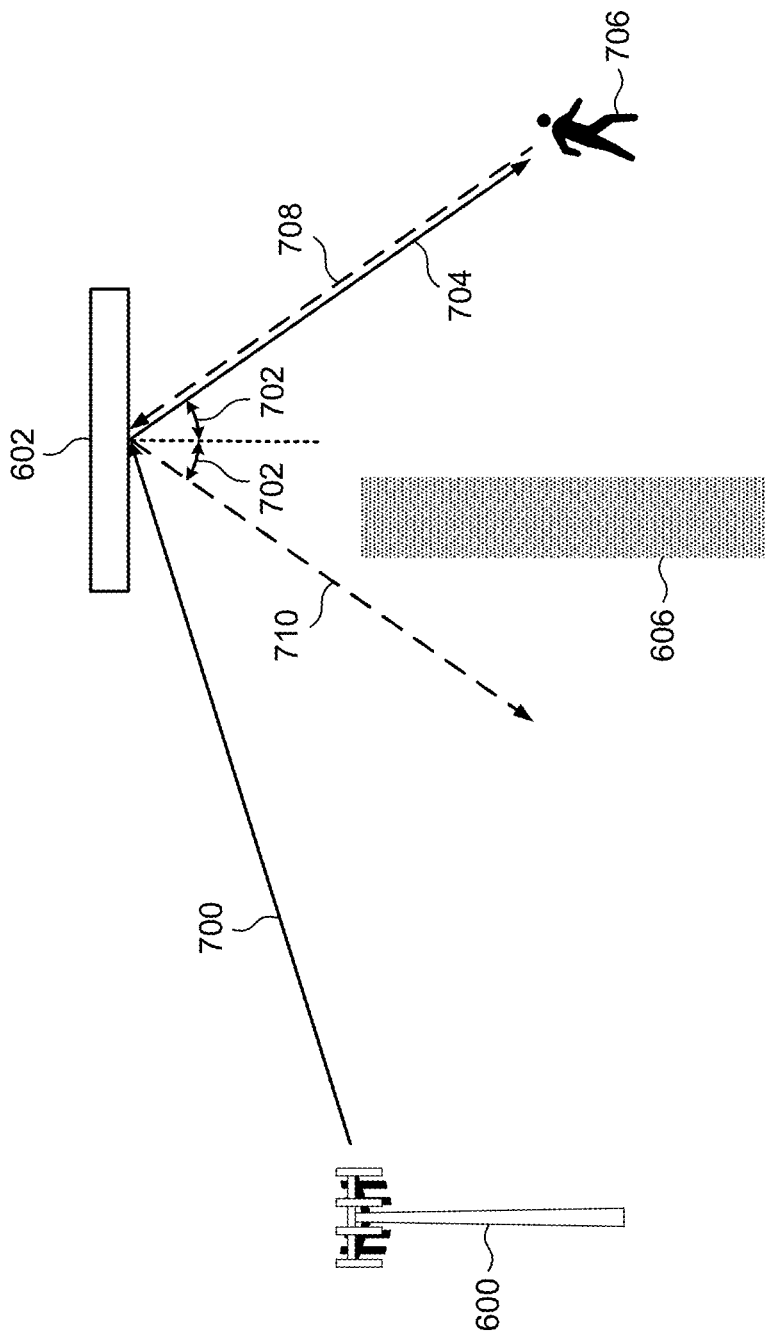
FIG. 7 illustrates one technical difficulty with attempting to perform monostatic sensing with a RIS.

FIG. 7 illustrates one technical difficulty with attempting to perform monostatic sensing with a RIS. FIG. shows a scenario involving the gNB 600, RIS 602, and obstacle 606 like the ones shown in FIG. 6, the descriptions of which will not be repeated here. The gNB 600 sends a DL transmission 700, which reflects off of the RIS 602 at the reflection angle 702 as beam 704. The beam 704 reflects off of a person 706 as reflected beam 708. Reflected beam 708 reflects off of the RIS 602 at the same reflection angle 702, as beam 710. Since the beam 710 is not pointing directly towards the gNB 600, the gNB 600 may not receive the beam 710, or may receive the beam 710 but at so attenuated a power that the gNB 600 cannot use (or even detect) the beam 710 for sensing purposes. Thus, the non-reciprocal reflection angle may result in a reflected beam 710 having a signal and interference to noise ratio (SINR) that is insufficient for sensing purposes.

A number of techniques are therefore proposed to address this technical difficulty.

Figure 8A:
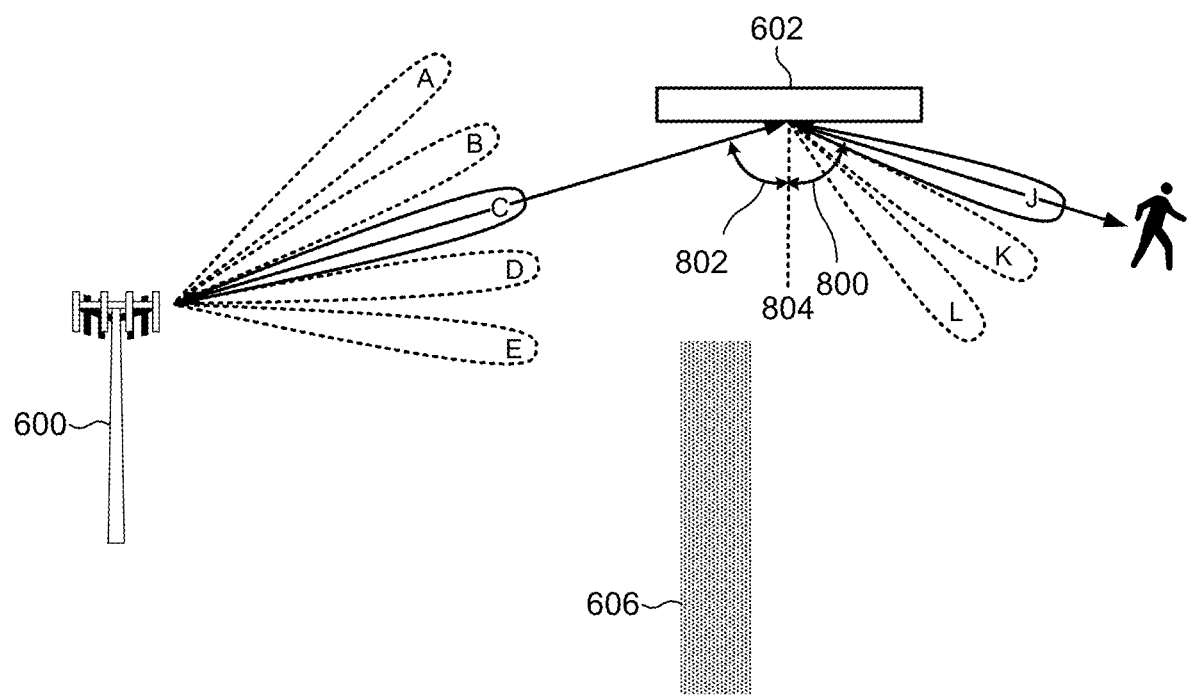
FIG. 8A and FIG. 8B illustrate two approaches that can be used for monostatic sensing without a direct line of sight (LOS) channel to the target, according to aspects of the disclosure.
Figure 8B:
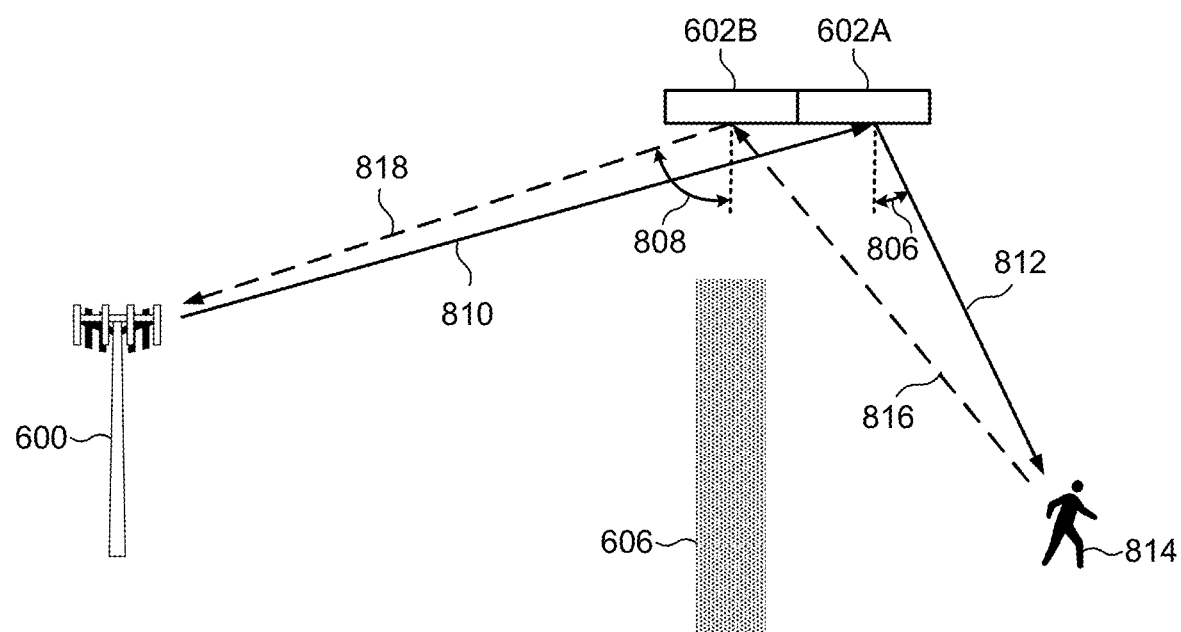

FIG. 8A and FIG. 8B illustrate two approaches that can be used for monostatic sensing without a direct (LOS) channel to the target, according to aspects of the disclosure.

FIG. 8A illustrates an approach in which only reciprocal sets of beams between the gNB 600 and the RIS 602 are used for sensing slots. Reciprocal sets of beams are defined as beams in which the control voltage used to set the DL reflection angle 800 is the same as the control voltage used to set the UL reflection angle 802 e.g., $\{V_i^{(DL)}\}=\{V_i^{(UL)}\}$ for sensing slots.

In the example illustrated in FIG. 8A, this corresponds to beams in which the DL reflection angle 800 equals the UL reflection angle 802, i.e., beam C from the gNB 600 and beam J from the RIS 602. Although the set of beams that satisfy the control voltage equation above are shown in FIG. 8A as having the same angle magnitude but reciprocals of each other, e.g., angle 800 and angle 802 are both 70 degrees off of the normal 804, where angle 800 is positive 70 degrees from the normal 804 and angle 802 is negative 70 degrees from the normal 804.

In this approach, a set of reciprocal beams are configured and shared between the gNB 600 and the RIS 602, e.g., via gNB-RIS signaling. In some aspects, the set of reciprocal beams corresponds to the set of reciprocal voltage settings on the RIS 602 side. In some aspects, for slots for sensing, only the set of reciprocal beams are used by the RIS 602. In some aspects, the RIS 602 is configured/indicated with slots to use reciprocal beams in semi-static or dynamic manner.

FIG. 8B illustrates an approach in which a multi-panel RIS is used with a reciprocal voltage setting. In the example illustrated in FIG. 8B, a RIS has a first panel 602A and a second panel 602B. The first panel 602A has a control voltage set $\{V_i^{(DL)}\}$ that creates a first reflection angle 806, and the second panel 602B has a control voltage set $\{V_i^{(UL)}\}$ that creates a second reflection angle 808, which is a different reflection angle than the first reflection angle 806. The first reflection angle 806 causes a DL transmission 810 to be reflected off of the first panel 602A as beam 812 towards the target 814. Some of beam 812 is reflected off of the target 814 back towards the second panel 602B as beam 816. Beam 816 is reflected from the second panel 602B towards the gNB 600 as beam 818. In some aspects, post-processing is performed to identify and use the first arriving reflection signal and to suppress the later-arriving signals from other reflection paths.

Figure 9A:
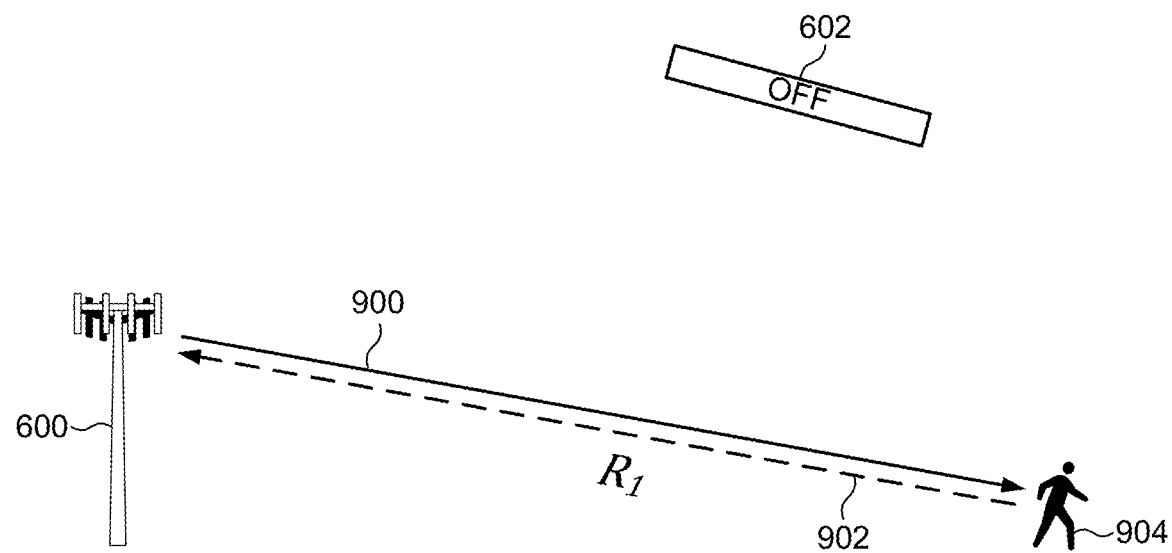
FIG. 9A and FIG. 9B illustrate an approach that can be used for monostatic sensing with a direct LOS channel to the target, according to aspects of the disclosure.
Figure 9B:
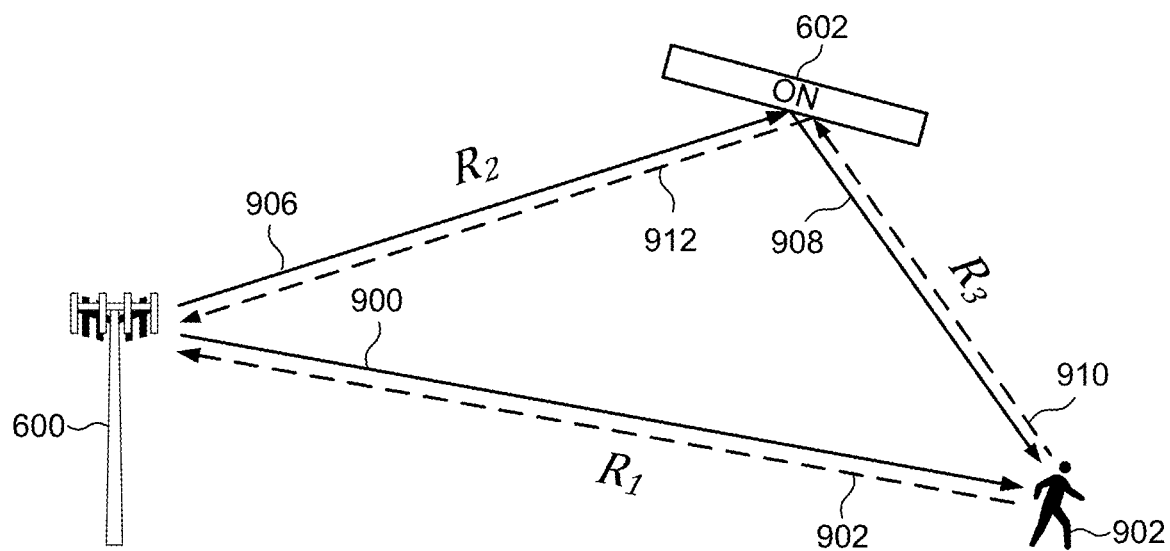

FIG. 9A and FIG. 9B illustrate an approach that can be used for monostatic sensing with a direct (LOS) channel to the target, according to aspects of the disclosure. In this approach, the gNB 600 performs the sensing signal transmission multiple times: at least one time with the RIS 602 off, to measure the direct path, as shown in FIG. 9A, and at least one time with the RIS 602 on, to measure the path reflected by the RIS 602, as shown in FIG. 9B. In this approach, RIS 602 on/off timing is be provided by the gNB 600, e.g., via control signaling to get monostatic sensing information.

In FIG. 9A, the first sensing signal transmission 900 generates a reflection signal 902 from a target 904. Because the RIS 602 is off, it does not reflect any signal either towards the target 904 or towards the gNB 600. From the timing of the reception of the reflection signal 902, the direct range $R_1$ may be calculated.

In FIG. 9B, the second sending signal 906 and its reflection 908 off of the RIS 602, along with the reflection signal 910 from the target and its reflection 912 off of the RIS 602, can be used to determine the reflected range ($R_2+R_3$). Target localization can then be derived based on the measurements in post processing. In some aspects, the individual values of $R_1$, $R_2$, and $R_3$ can be obtained, assuming that $R_2$ is known to the gNB 600 (or separately measured).

Figure 10:
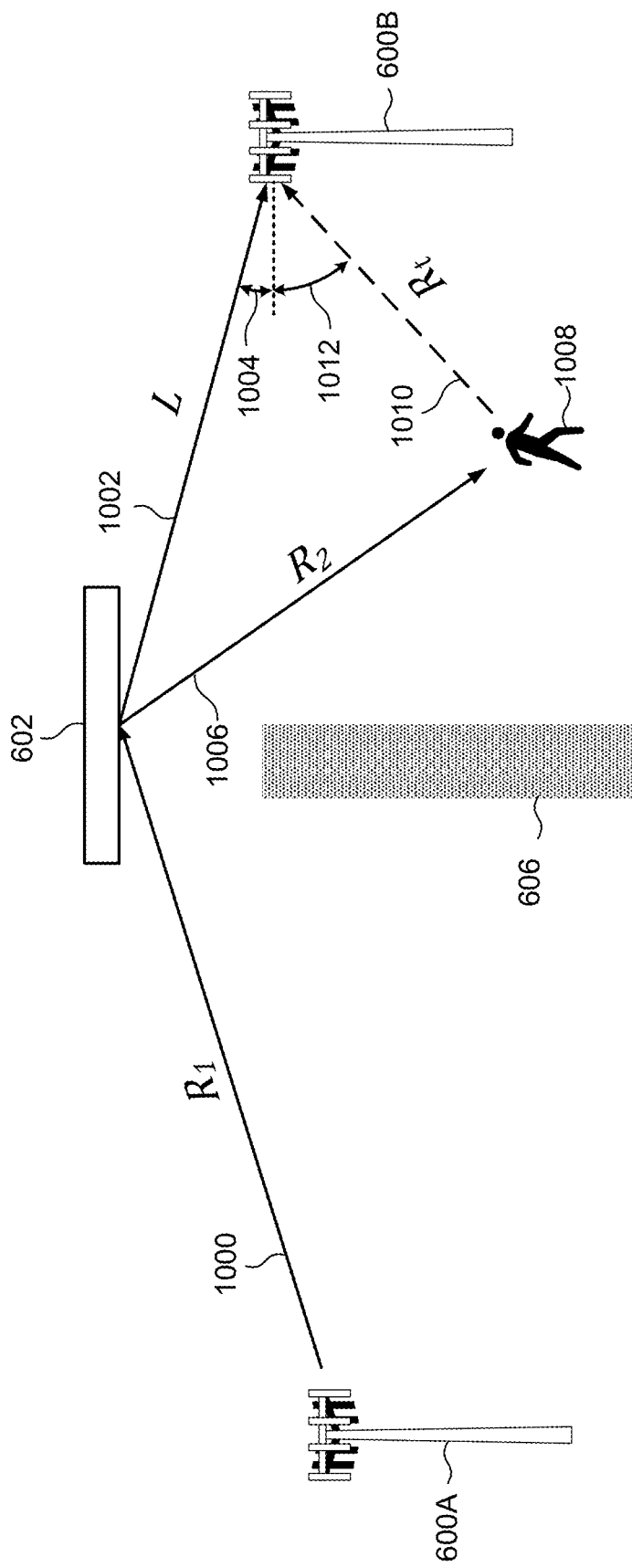
FIG. 10 illustrates an approach that can be used for monostatic sensing with a direct LOS channel to the target, according to aspects of the disclosure.

FIG. 10 illustrates approaches that can be used for bi-static sensing without a direct (LOS) channel to the target, according to aspects of the disclosure. In this approach, which involves a first gNB 600A, a second gNB 600B, and a RIS 602, the first gNB 600A sends a sensing signal 1000 that is reflected directly to the second gNB 600B by the RIS 602 as signal 1002, having a first angle of arrival (AoA) 1004. The same signal 1000 is also reflected from the RIS 602 as signal 1006 to the target 1008, and reflects off of the target 1008 as signal 1010 to the second gNB 600B, having a second AoA 1012. For brevity of description, the path that includes signal 1000 and signal 1002 is referred to herein as the "first arrival path," and the path that includes signal 1000, signal 1006, and signal 1010 is referred to herein as the "echo path." Both the first arrival path and the echo path would be observed by the second gNB 600B. The delay components between the first gNB 600A and the RIS 602 should be removed during post-processing.

In some aspects, the delay between the first gNB 600A and the RIS 602 (corresponding to distance $R_1$) is signaled to the second gNB 600B.

In some aspects, the distance $R_T$ is calculated by the second gNB 600B. In the example shown in FIG. 10, the path length ($R_1+L$) and the first AoA 1004 can be measured by estimating the first arrival path, or it may be provided to the second gNB 600B via signaling. In the example shown in FIG. 10, the path length ($R_1+R_2+R_t$) and the second AoA 1012 can be measured by estimating the echo path. After subtracting $R_1$, the target range with respect to the second gNB 600B can be calculated as:

$$R_t = \frac{R_{sum}^2 - L^2}{2(R_{sum} - L\cos(\theta_{AoA} + \theta_{Los}))}$$

where $R_{sum}=R_2+R_t$, $\theta_{Los}$ is the first AoA 1004 and $\theta_{AoA}$ is the second AoA 1012.

In some aspects, Rt is calculated by the first gNB 600A. In the example shown in FIG. 10, $R_2$, $R_t$, and second AoA 1012 (and optionally $R_1$, also) are measured and reported. Additionally, L and first AoA 1004 (and optionally $R_1$, also) are measured and reported, or are already known to the first gNB 600A. $R_t$ can then be calculated based on the equation above.

Figure 11:
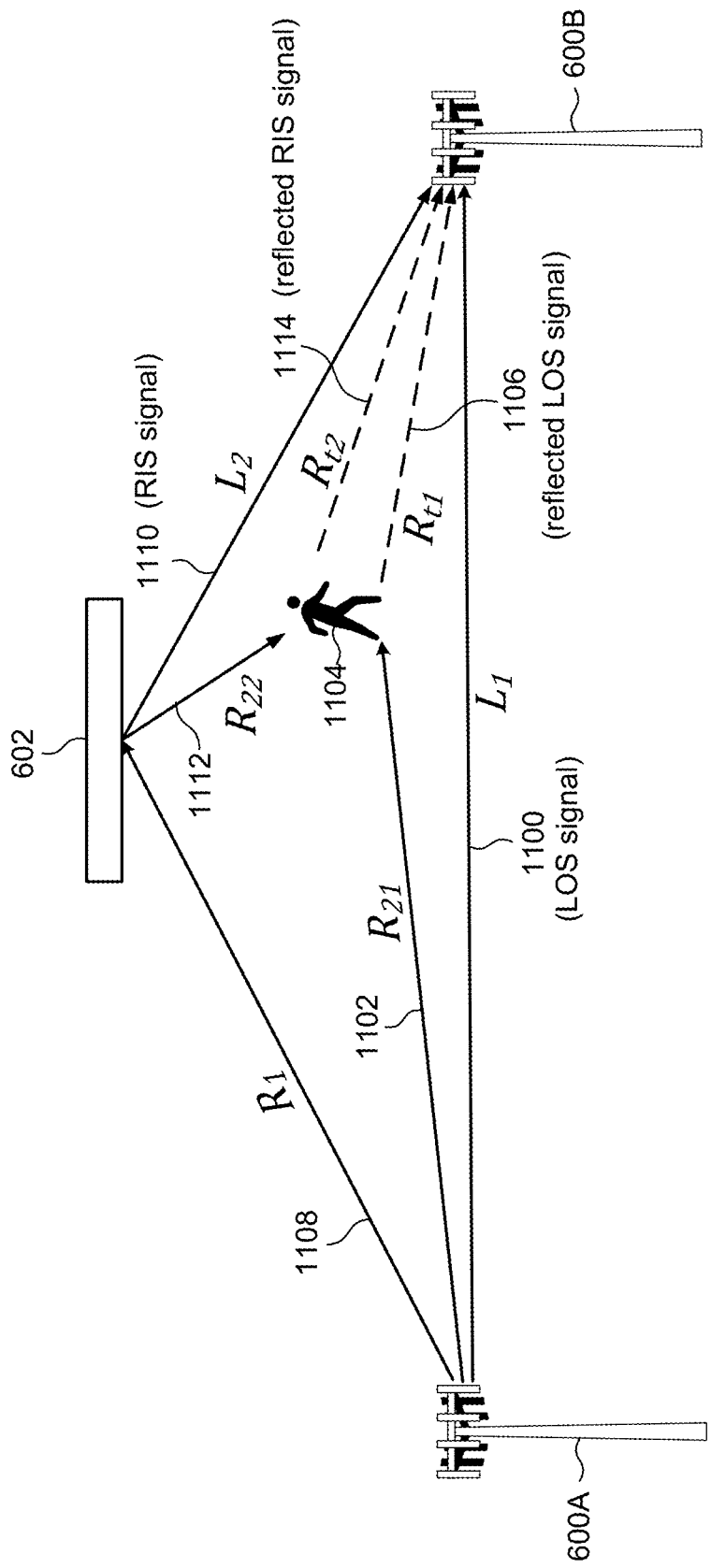
FIG. 11 illustrates an approach that can be used for multistatic sensing with a direct LOS channel to the target, according to aspects of the disclosure.

FIG. 11 illustrates an approach that can be used for multistatic sensing with a direct (LOS) channel to the target, according to aspects of the disclosure. In this approach, the second gNB 600B receives a direct signal 1100 from the first gNB 600A (referred to herein as the LOS signal) as well as signal 1102 that was reflected off of the target 1104 and received by the second gNB 600B as signal 1106 (referred to herein as the reflected LOS signal). The second gNB 600B also receives a signal 1108 from the first gNB 600A that was reflected from the RIS 602 and received by the second gNB 600B as signal 1110 (referred to herein as the RIS signal). The second gNB 600B also receives the signal 1108 that was reflected from the RIS 602 as signal 1112 and then reflected off of the target 1104 and received by the second gNB 600B as signal 1114 (referred to herein as the reflected RIS signal). These LOS and RIS paths between the first gNB 600A and the second gNB 600B can provide the spatial diversity gain to derive the sensing information.

In some aspects, the delay between the first gNB 600A and the RIS 602 (corresponding to the distance $R_1$) is signaled to the second gNB 600B. The second gNB 600B can observe signals on multiple paths, including the LOS signal ($L_1$), the reflected LOS signal ($R_{21}+R_{t1}$), the RIS signal ($R_1+L_2$), and the reflected RIS signal ($R_1+R_{22}+R_{t2}$).

In some aspects, bi-static sensing can be achieved by taking first measurements while the RIS 602 is off and then taking second measurement while the RIS 602 is on. In the example illustrated in FIG. 11, LOS bistatic information $L_1$, ($R_{21}+R_{t1}$), and the AoA of $R_{t1}$ can be derived when the RIS 602 is off. In post processing, the individual values of $R_{21}$ and $R_{t1}$ can be calculated based on triangle law. RIS bistatic information ($R_1+L_2$), the AoA of $L_2$, ($R_1+R_{22}+R_{t2}$), and the AoA of $R_{t2}$ can be derived when the RIS 602 is on. In post processing, the individual values of $R_{22}$ and $R_{t2}$ can be calculated when $R_1$ is already known to the second gNB 600B by signaling. In some aspects, the final target range can be more accurately derived after acquiring both $R_{t1}$ and $R_{t2}$ in the post processing.

Figure 12:
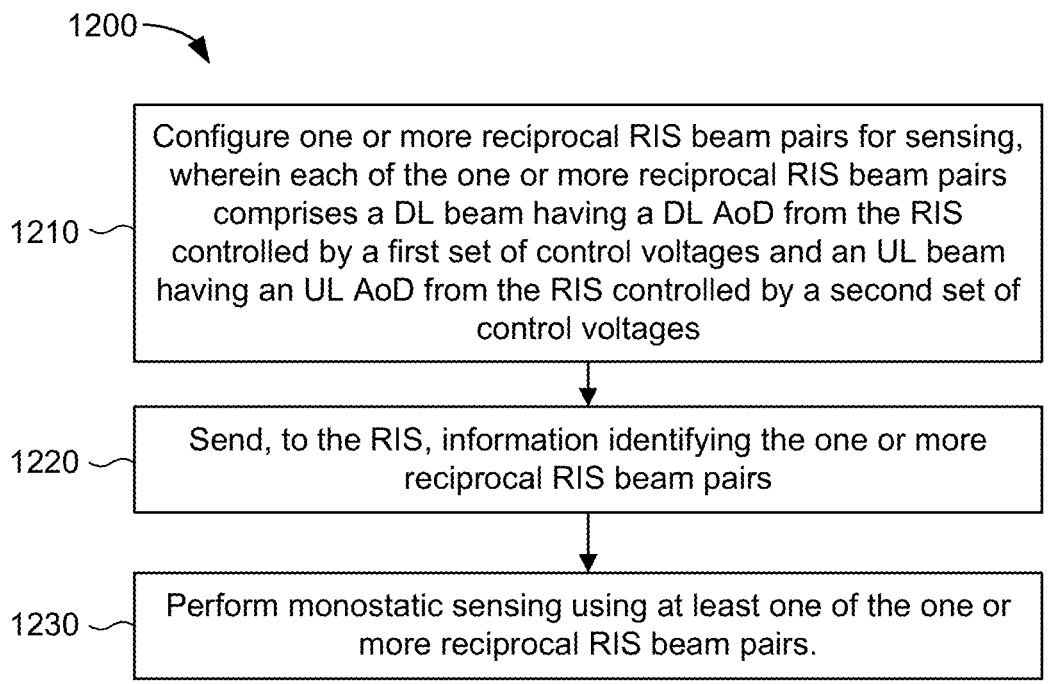
FIG. 12 is a flowchart of an example process associated with RIS-assisted sensing, according to aspects of the disclosure.

FIG. 12 is a flowchart of an example process 1200 associated with RIS-assisted sensing, according to aspects of the disclosure. In some implementations, one or more process blocks of FIG. 12 may be performed by a BS (e.g., BS 102, a gNB, etc.). In some implementations, one or more process blocks of FIG. 12 may be performed by another device or a group of devices separate from or including the BS. Additionally, or alternatively, one or more process blocks of FIG. 12 may be performed by one or more components of BS 304, such as processor(s) 384, memory 386, WWAN transceiver(s) 350, short-range wireless transceiver(s) 360, satellite signal receiver 370, network transceiver(s) 380, and sensing module(s) 388, any or all of which may be means for performing the operations of process 1200.

As shown in FIG. 12, process 1200 may include, at block 1210, defining or configuring one or more reciprocal RIS beam pairs for sensing, wherein each of the one or more reciprocal RIS beam pairs comprises a downlink (DL) beam having a DL angle of departure (DL AoD) from the RIS controlled by a first set of control voltages and an uplink (UL) beam having an UL AoD from the RIS controlled by a second set of control voltages. Means for performing the operation of block 1210 may include the processor(s) 384, memory 386, WWAN transceiver(s) 350, and the sensing module(s) 388 of the BS 304. For example, the BS 304 may define or configure the at least one reciprocal RIS beam pair for sensing using the processor(s) 384 and memory 386.

As further shown in FIG. 12, process 1200 may include, at block 1220, sending, to the RIS, information identifying the one or more reciprocal RIS beam pairs. Means for performing the operation of block 1220 may include the processor(s) 384, memory 386, WWAN transceiver(s) 350, and the sensing module(s) 388 of the BS 304. For example, the BS 304 may send the information to the RIS using the transmitter(s) 354.

As further shown in FIG. 12, process 1200 may include, at block 1230, performing monostatic sensing using at least one of the one or more reciprocal RIS beam pairs. Means for performing the operation of block 1230 may include the processor(s) 384, memory 386, WWAN transceiver(s) 350, and the sensing module(s) 388 of the BS 304. For example, the BS 304 may perform monostatic sensing by transmitting sensing signals using the transmitter(s) 354, receiving reflections of those sensing signals using the receiver(s) 352, and use the timing of the sent and received signals to determine range and/or position using the processor(s) 384 and memory 386.

In some aspects, sending the information identifying the one or more reciprocal RIS beam pairs comprises sending information mapping sensing slots to reciprocal RIS beam pairs.

In some aspects, sending the information identifying the one or more reciprocal RIS beam pairs comprises sending information mapping sensing slots to reciprocal RIS beam pairs in a semi-static or dynamic manner.

In some aspects, for each of the one or more reciprocal RIS beam pairs, the first set of control voltages for the DL beam and the second set of control voltages for the UL beam are the same.

In some aspects, for each of the one or more reciprocal RIS beam pairs, the first set of control voltages are used by a first panel of the RIS for reflecting the DL beam and wherein the second set of control voltages are used by a second panel of the RIS for reflecting the UL beam.

In some aspects, performing monostatic sensing comprises sending, to the RIS, a sensing signal, receiving, from the RIS, a reflection of the sensing signal from a target, and determining a distance from the RIS to the target based on the sensing signal, the reflection of the sensing signal, and a position of the RIS relative to the BS.

In some aspects, process 1200 further comprises determining a position of the target based on the distance from the RIS to the target and the DL AoD from the RIS.

Process 1200 may include additional implementations, such as any single implementation or any combination of implementations described below and/or in connection with one or more other processes described elsewhere herein. Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
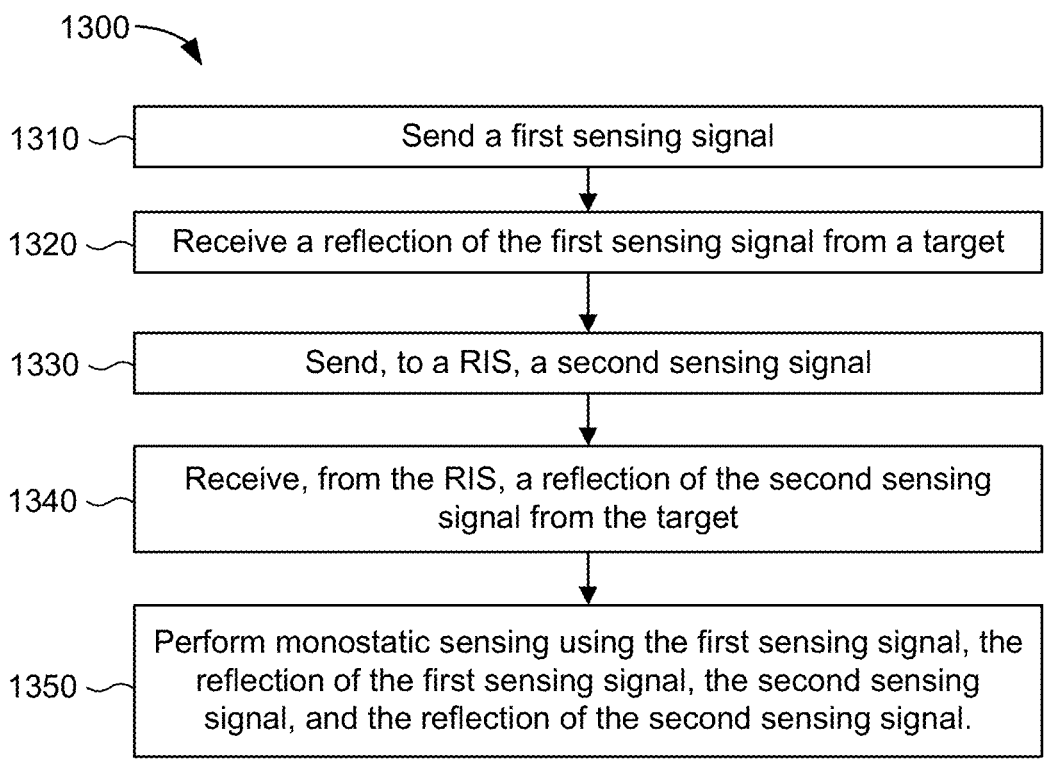
FIG. 13 is a flowchart of another example process associated with RIS-assisted sensing, according to aspects of the disclosure.

FIG. 13 is a flowchart of an example process 1300 associated with RIS-assisted sensing, according to aspects of the disclosure. In some implementations, one or more process blocks of FIG. 13 may be performed by a BS (e.g., BS 102, a gNB, etc.). In some implementations, one or more process blocks of FIG. 13 may be performed by another device or a group of devices separate from or including the BS. Additionally, or alternatively, one or more process blocks of FIG. 13 may be performed by one or more components of BS 304, such as processor(s) 384, memory 386, WWAN transceiver(s) 350, short-range wireless transceiver(s) 360, satellite signal receiver 370, network transceiver(s) 380, and sensing module(s) 388, any or all of which may be means for performing the operations of process 1300.

As shown in FIG. 13, process 1300 may include, at block 1310, sending a first sensing signal, and, at block 1320, receiving a reflection of the first sensing signal from a target. Means for performing the operation of block 1310 and block 1320 may include the processor(s) 384, memory 386, WWAN transceiver(s) 350, and the sensing module(s) 388 of the BS 304. For example, the BS 304 may send the first sensing signal using the transmitter(s) 354 and may receive the reflection of the first sensing signal using the receiver(s) 352.

As further shown in FIG. 13, process 1300 may include, at block 1330, sending, to a RIS, a second sensing signal, and, at block 1340, receiving, from the RIS, a reflection of the second sensing signal from the target. Means for performing the operation of block 1330 and block 1340 may include the processor(s) 384, memory 386, WWAN transceiver(s) 350, and the sensing module(s) 388 of the BS 304. For example, the BS 304 may send the second sensing signal using the transmitter(s) 354 and may receive the reflection of the second sensing signal using the receiver(s) 352.

As further shown in FIG. 13, process 1300 may include, at block 1350, performing monostatic sensing using the first sensing signal, the reflection of the first sensing signal, the second sensing signal, and the reflection of the second sensing signal. Means for performing the operation of block 1350 may include the processor(s) 384, memory 386, WWAN transceiver(s) 350, and the sensing module(s) 388 of the BS 304. For example, the BS 304 may use the timing of the sent and received signals to determine range and/or position using the processor(s) 384 and memory 386.

In some aspects, process 1300 further comprises sending, to the RIS, configuration information to configure when the RIS is in an active state and when the RIS is in an inactive state.

In some aspects, sending the first sensing signal and receiving the reflection of the first sensing signal is performed while the RIS is in the inactive state.

In some aspects, sending the second sensing signal and receiving the reflection of the second sensing signal is performed while the RIS is in the active state.

In some aspects, performing monostatic sensing using the first sensing signal, the reflection of the first sensing signal, the second sensing signal, and the reflection of the second sensing signal comprises determining a first distance from the BS to the target based on a timing of the first sensing signal and the reflection of the first sensing signal, determining a second distance from the BS to the target based on a timing of the second sensing signal and the reflection of the second sensing signal, and determining a position of the target based on a distance from the BS to the RIS, the first distance from the BS to the target, and the second distance from the BS to the target.

Process 1300 may include additional implementations, such as any single implementation or any combination of implementations described below and/or in connection with one or more other processes described elsewhere herein. Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
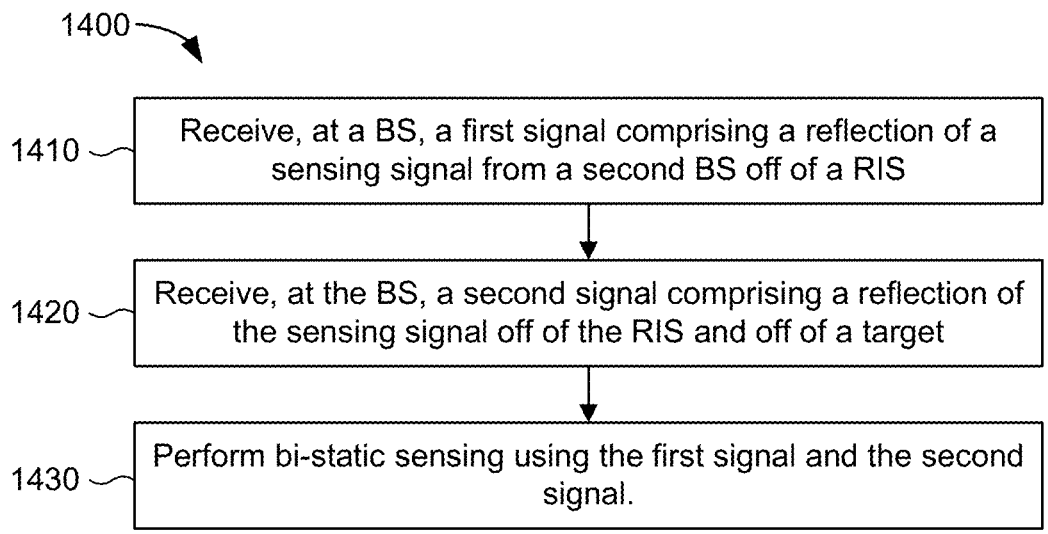
FIG. 14 is a flowchart of another example process associated with RIS-assisted sensing, according to aspects of the disclosure.

FIG. 14 is a flowchart of an example process 1400 associated with RIS-assisted sensing, according to aspects of the disclosure. In some implementations, one or more process blocks of FIG. 14 may be performed by a BS (e.g., BS 102, a gNB, etc.). In some implementations, one or more process blocks of FIG. 14 may be performed by another device or a group of devices separate from or including the BS. Additionally, or alternatively, one or more process blocks of FIG. 14 may be performed by one or more components of BS 304, such as processor(s) 384, memory 386, WWAN transceiver(s) 350, short-range wireless transceiver(s) 360, satellite signal receiver 370, network transceiver(s) 380, and sensing module(s) 388, any or all of which may be means for performing the operations of process 1400.

As shown in FIG. 14, process 1400 may include, at block 1410, receiving, at a BS, a first signal comprising a reflection of a sensing signal from a second BS off of a RIS. Means for performing the operation of block 1410 may include the processor(s) 384, memory 386, WWAN transceiver(s) 350, and the sensing module(s) 388 of the BS 304. For example, the BS 304 may receive the first signal via the receiver(s) 352.

As further shown in FIG. 14, process 1400 may include, at block 1420, receiving, at the BS, a second signal comprising a reflection of the sensing signal off of the RIS and off of a target. Means for performing the operation of block 1420 may include the processor(s) 384, memory 386, WWAN transceiver(s) 350, and the sensing module(s) 388 of the BS 304. For example, the BS 304 may receive the second signal via the receiver(s) 352.

As further shown in FIG. 14, process 1400 may include, at block 1430, performing bi-static sensing using the first signal and the second signal. Means for performing the operation of block 1430 may include the processor(s) 384, memory 386, WWAN transceiver(s) 350, and the sensing module(s) 388 of the BS 304. For example, the BS 304 may perform bi-static sensing based on the relative timing of the received signals and calculations performed by the processor(s) 384 and memory 386.

In some aspects, performing bi-static sensing using the first signal and the second signal comprises determining a distance from the target to the BS based on a timing of the first signal, a timing of the second signal, a distance from the RIS to the BS, an angle of arrival (AoA) of the first signal, and an AoA of the second signal.

In some aspects, process 1400 further comprises determining a position of the target based on the distance from the target to the BS and the AoA of the second signal.

In some aspects, performing bi-static sensing using the first signal and the second signal comprises sending, to the second BS, information indicating a timing of the first signal, a timing of the second signal, and an AoA of the second signal, and receiving, from the second BS, information indicating a position of the target.

In some aspects, performing bi-static sensing using the first signal and the second signal comprises sending, to the second BS, information indicating a timing of the first signal, a timing of the second signal, a distance from the RIS to the BS, an angle of arrival (AoA) of the first signal, and an AoA of the second signal, and receiving, from the second BS, information indicating a position of the target.

Process 1400 may include additional implementations, such as any single implementation or any combination of implementations described below and/or in connection with one or more other processes described elsewhere herein. Although FIG. 14 shows example blocks of process 1400, in some implementations, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
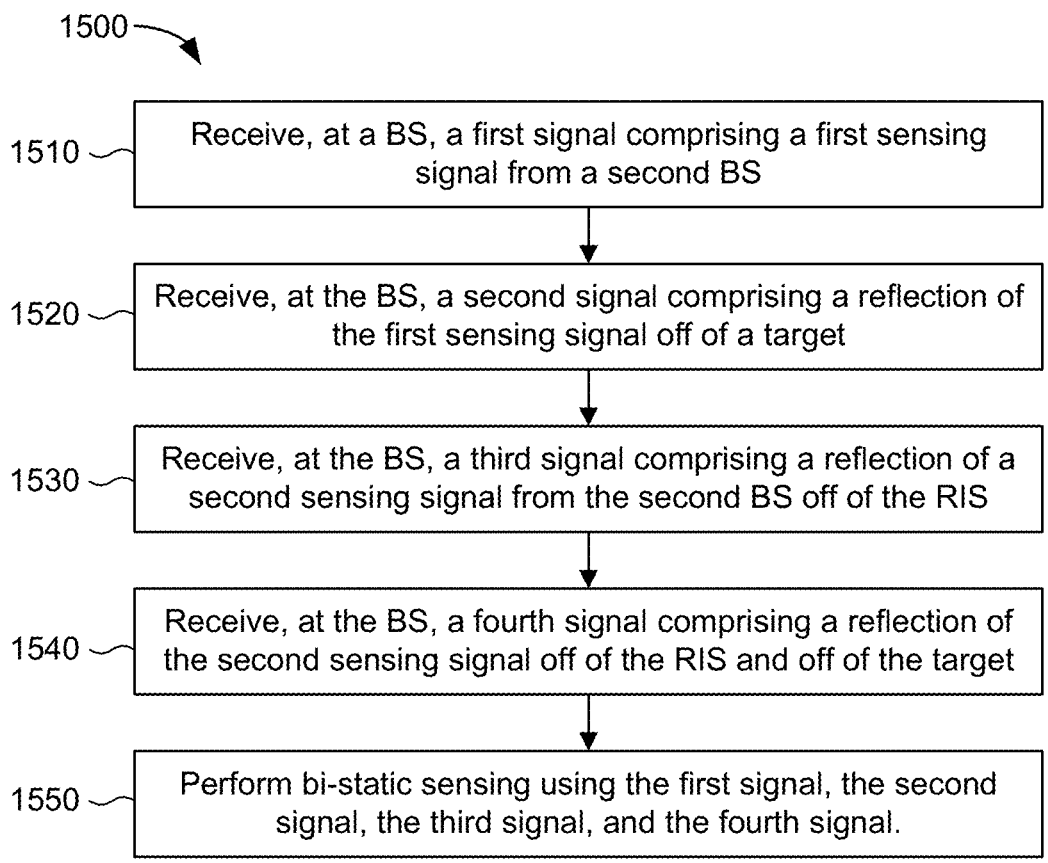
FIG. 15 is a flowchart of another example process associated with RIS-assisted sensing, according to aspects of the disclosure.

FIG. 15 is a flowchart of an example process 1500 associated with RIS-assisted sensing, according to aspects of the disclosure. In some implementations, one or more process blocks of FIG. 15 may be performed by a BS (e.g., BS 102, a gNB, etc.). In some implementations, one or more process blocks of FIG. 15 may be performed by another device or a group of devices separate from or including the BS. Additionally, or alternatively, one or more process blocks of FIG. 15 may be performed by one or more components of BS 304, such as processor(s) 384, memory 386, WWAN transceiver(s) 350, short-range wireless transceiver(s) 360, satellite signal receiver 370, network transceiver(s) 380, and sensing module(s) 388, any or all of which may be means for performing the operations of process 1500.

As shown in FIG. 15, process 1500 may include, at block 1510, receiving, at a base station (BS), a first signal comprising a first sensing signal from a second BS. Means for performing the operation of block 1510 may include the processor(s) 384, memory 386, WWAN transceiver(s) 350, and the sensing module(s) 388 of the BS 304. For example, the BS 304 may receive the first signal via the receiver(s) 352.

As shown in FIG. 15, process 1500 may include, at block 1520, receiving, at the BS, a second signal comprising a reflection of the first sensing signal off of a target. Means for performing the operation of block 1520 may include the processor(s) 384, memory 386, WWAN transceiver(s) 350, and the sensing module(s) 388 of the BS 304. For example, the BS 304 may receive the second signal via the receiver(s) 352.

As shown in FIG. 15, process 1500 may include, at block 1530, receiving, at the BS, a third signal comprising a reflection of a second sensing signal from the second BS off of a RIS. Means for performing the operation of block 1530 may include the processor(s) 384, memory 386, WWAN transceiver(s) 350, and the sensing module(s) 388 of the BS 304. For example, the BS 304 may receive the third signal via the receiver(s) 352.

As shown in FIG. 15, process 1500 may include, at block 1540, receiving, at the BS, a fourth signal comprising a reflection of the second sensing signal off of the RIS and off of the target. Means for performing the operation of block 1540 may include the processor(s) 384, memory 386, WWAN transceiver(s) 350, and the sensing module(s) 388 of the BS 304. For example, the BS 304 may receive the fourth signal via the receiver(s) 352.

As shown in FIG. 15, process 1500 may include, at block 1550, performing bi-static sensing using the first signal, the second signal, the third signal, and the fourth signal. Means for performing the operation of block 1550 may include the processor(s) 384, memory 386, WWAN transceiver(s) 350, and the sensing module(s) 388 of the BS 304. For example, the BS 304 may perform bi-static sensing based on information calculated by the processor(s) 384 and memory 386, information received from the second BS via the receiver(s) 352, or a combination thereof. In some aspects, BS 304 may send information to the second BS so that the second BS can perform the bi-static sensing calculations, and optionally share the results of those calculations with the BS 304.

In some aspects, process 1500 further comprises sending, to the RIS, configuration information that configures when the RIS is in an active state and when the RIS is in an inactive state.

In some aspects, receiving the first signal and receiving the second signal occurs while the RIS is in the inactive state.

In some aspects, receiving the third signal and receiving the fourth signal occurs while the RIS is in the active state.

In some aspects, performing bi-static sensing using the first signal, the second signal, the third signal, and the fourth signal comprises determining a distance from the BS to the target based on: a timing of the first signal, a timing of the second signal, a distance from the RIS to the BS, an angle of arrival (AoA) of the first signal, and an AoA of the second signal; a timing of the third signal, a timing of the fourth signal, a distance from the RIS to the BS, an AoA of the third signal, and an AoA of the fourth signal; or a combination thereof.

Process 1500 may include additional implementations, such as any single implementation or any combination of implementations described below and/or in connection with one or more other processes described elsewhere herein. Although FIG. 15 shows example blocks of process 1500, in some implementations, process 1500 may include additional blocks, fewer blocks, different blocks, or differently arranged blocks than those depicted in FIG. 15. Additionally, or alternatively, two or more of the blocks of process 1500 may be performed in parallel.

As will be appreciated, a technical advantage of the techniques disclosed herein is that the use of a RIS allows sensing techniques that were previously unattainable, such as monostatic or bistatic sensing without a direct channel to the target, and improved accuracy of monostatic or bi-static due to the additional signal paths that a RIS can provide.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method, performed by a base station (BS), of reconfigurable intelligent surface (RIS)-assisted sensing, the method comprising: configuring one or more reciprocal RIS beam pairs for sensing, wherein each of the one or more reciprocal RIS beam pairs comprises a downlink (DL) beam having a DL angle of departure (DL AoD) from a RIS controlled by a first set of control voltages and an uplink (UL) beam having an UL AoD from the RIS controlled by a second set of control voltages; sending, to the RIS, information identifying the one or more reciprocal RIS beam pairs; and performing monostatic sensing using at least one of the one or more reciprocal RIS beam pairs.

Clause 2. The method of clause 1, wherein sending the information identifying the one or more reciprocal RIS beam pairs comprises sending information mapping sensing slots to reciprocal RIS beam pairs.

Clause 3. The method of clause 2, wherein sending the information identifying the one or more reciprocal RIS beam pairs comprises sending information mapping sensing slots to reciprocal RIS beam pairs in a semi-static or dynamic manner.

Clause 4. The method of any of clauses 1 to 3, wherein, for each of the one or more reciprocal RIS beam pairs, the first set of control voltages for the DL beam and the second set of control voltages for the UL beam are the same.

Clause 5. The method of any of clauses 1 to 4, wherein, for each of the one or more reciprocal RIS beam pairs, the first set of control voltages are used by a first panel of the RIS for reflecting the DL beam and wherein the second set of control voltages are used by a second panel of the RIS for reflecting the UL beam.

Clause 6. The method of any of clauses 1 to 5, wherein performing monostatic sensing comprises: sending, to the RIS, a sensing signal; receiving, from the RIS, a reflection of the sensing signal from a target; and determining a distance from the RIS to the target based on the sensing signal, the reflection of the sensing signal, and a position of the RIS relative to the BS.

Clause 7. The method of clause 6, further comprising determining a position of the target based on the distance from the RIS to the target and the DL AoD from the RIS.

Clause 8. A method, performed by a base station (BS), of reconfigurable intelligent surface (RIS)-assisted sensing, the method comprising: sending a first sensing signal; receiving a reflection of the first sensing signal from a target; sending, to a RIS, a second sensing signal; receiving, from the RIS, a reflection of the second sensing signal from the target; and performing monostatic sensing using the first sensing signal, the reflection of the first sensing signal, the second sensing signal, and the reflection of the second sensing signal.

Clause 9. The method of clause 8, further comprising sending, to the RIS, configuration information to configure when the RIS is in an active state and when the RIS is in an inactive state.

Clause 10. The method of clause 9, wherein sending the first sensing signal and receiving the reflection of the first sensing signal is performed while the RIS is in the inactive state.

Clause 11. The method of any of clauses 9 to 10, wherein sending the second sensing signal and receiving the reflection of the second sensing signal is performed while the RIS is in the active state.

Clause 12. The method of any of clauses 8 to 11, wherein performing monostatic sensing using the first sensing signal, the reflection of the first sensing signal, the second sensing signal, and the reflection of the second sensing signal comprises: determining a first distance from the BS to the target based on a timing of the first sensing signal and the reflection of the first sensing signal; determining a second distance from the BS to the target based on a timing of the second sensing signal and the reflection of the second sensing signal; and determining a position of the target based on a distance from the BS to the RIS, the first distance from the BS to the target, and the second distance from the BS to the target.

Clause 13. A method of reconfigurable intelligent surface (RIS)-assisted sensing, the method comprising: receiving, at a base station (BS), a first signal comprising a reflection of a sensing signal from a second BS off of a RIS; receiving, at the BS, a second signal comprising a reflection of the sensing signal from the second BS off of the RIS and off of a target; and performing bi-static sensing using the first signal and the second signal.

Clause 14. The method of clause 13, wherein performing bi-static sensing using the first signal and the second signal comprises: determining a distance from the target to the BS based on a timing of the first signal, a timing of the second signal, a distance from the RIS to the BS, an angle of arrival (AoA) of the first signal, and an AoA of the second signal.

Clause 15. The method of clause 14, further comprising determining a position of the target based on the distance from the target to the BS and the AoA of the second signal.

Clause 16. The method of any of clauses 13 to 15, wherein performing bi-static sensing using the first signal and the second signal comprises: sending, to the second BS, information indicating a timing of the first signal, a timing of the second signal, and an AoA of the second signal; and receiving, from the second BS, information indicating a position of the target.

Clause 17. The method of any of clauses 13 to 16, wherein performing bi-static sensing using the first signal and the second signal comprises: sending, to the second BS, information indicating a timing of the first signal, a timing of the second signal, a distance from the RIS to the BS, an angle of arrival (AoA) of the first signal, and an AoA of the second signal; and receiving, from the second BS, information indicating a position of the target.

Clause 18. A method of reconfigurable intelligent surface (RIS)-assisted sensing, the method comprising: receiving, at a base station (BS), a first signal comprising a first sensing signal from a second BS; receiving, at the BS, a second signal comprising a reflection of the first sensing signal off of a target; receiving, at the BS, a third signal comprising a reflection of a second sensing signal from the second BS off of a RIS; receiving, at the BS, a fourth signal comprising a reflection of the second sensing signal off of the RIS and off of the target; and performing bi-static sensing using the first signal, the second signal, the third signal, and the fourth signal.

Clause 19. The method of clause 18, comprising sending, to the RIS, configuration information that configures when the RIS is in an active state and when the RIS is in an inactive state.

Clause 20. The method of clause 19, wherein receiving the first signal and receiving the second signal occurs while the RIS is in the inactive state.

Clause 21. The method of any of clauses 19 to 20, wherein receiving the third signal and receiving the fourth signal occurs while the RIS is in the active state.

Clause 22. The method of any of clauses 19 to 21, wherein performing bi-static sensing using the first signal, the second signal, the third signal, and the fourth signal comprises determining a distance from the BS to the target based on: a timing of the first signal, a timing of the second signal, a distance from the RIS to the BS, an angle of arrival (AoA) of the first signal, and an AoA of the second signal; a timing of the third signal, a timing of the fourth signal, a distance from the RIS to the BS, an AoA of the third signal, and an AoA of the fourth signal; or a combination thereof.

Clause 23. A base station (BS), comprising: a memory; at least one transceiver; and at least one processor communicatively coupled to the memory and the at least one transceiver, the at least one processor configured to: configure one or more reciprocal reconfigurable intelligent surface (RIS) beam pairs for sensing, wherein each of the one or more reciprocal RIS beam pairs comprises a downlink (DL) beam having a DL angle of departure (DL AoD) from a RIS controlled by a first set of control voltages and an uplink (UL) beam having an UL AoD from the RIS controlled by a second set of control voltages; send, to the RIS via the at least one transceiver, information identifying the one or more reciprocal RIS beam pairs; and perform monostatic sensing using at least one of the one or more reciprocal RIS beam pairs.

Clause 24. The BS of clause 23, wherein, to send the information identifying the one or more reciprocal RIS beam pairs, the at least one processor is configured to send information mapping sensing slots to reciprocal RIS beam pairs.

Clause 25. The BS of clause 24, wherein, to send the information identifying the one or more reciprocal RIS beam pairs, the at least one processor is configured to send information mapping sensing slots to reciprocal RIS beam pairs in a semi-static or dynamic manner.

Clause 26. The BS of any of clauses 23 to 25, wherein, for each of the one or more reciprocal RIS beam pairs, the first set of control voltages for the DL beam and the second set of control voltages for the UL beam are the same.

Clause 27. The BS of any of clauses 23 to 26, wherein, for each of the one or more reciprocal RIS beam pairs, the first set of control voltages are used by a first panel of the RIS for reflecting the DL beam and wherein the second set of control voltages are used by a second panel of the RIS for reflecting the UL beam.

Clause 28. The BS of any of clauses 23 to 27, wherein, to perform monostatic sensing, the at least one processor is configured to: send, to the RIS via the at least one transceiver, a sensing signal; receive, from the RIS via the at least one transceiver, a reflection of the sensing signal from a target; and determine a distance from the RIS to the target based on the sensing signal, the reflection of the sensing signal, and a position of the RIS relative to the BS.

Clause 29. The BS of clause 28, wherein the at least one processor is further configured to determine a position of the target based on the distance from the RIS to the target and the DL AoD from the RIS.

Clause 30. A base station (BS), comprising: a memory; at least one transceiver; and at least one processor communicatively coupled to the memory and the at least one transceiver, the at least one processor configured to: send, via the at least one transceiver, a first sensing signal; receive, via the at least one transceiver, a reflection of the first sensing signal from a target; send, to a reconfigurable intelligent surface (RIS) via the at least one transceiver, a second sensing signal; receive, from the RIS via the at least one transceiver, a reflection of the second sensing signal from the target; and perform monostatic sensing using the first sensing signal, the reflection of the first sensing signal, the second sensing signal, and the reflection of the second sensing signal.

Clause 31. The BS of clause 30, wherein the at least one processor is further configured to send, to the RIS via the at least one transceiver, configuration information to configure when the RIS is in an active state and when the RIS is in an inactive state.

Clause 32. The BS of clause 31, wherein sending the first sensing signal and receiving the reflection of the first sensing signal is performed while the RIS is in the inactive state.

Clause 33. The BS of any of clauses 31 to 32, wherein sending the second sensing signal and receiving the reflection of the second sensing signal is performed while the RIS is in the active state.

Clause 34. The BS of any of clauses 30 to 33, wherein, to perform monostatic sensing using the first sensing signal, the reflection of the first sensing signal, the second sensing signal, and the reflection of the second sensing signal, the at least one processor is configured to: determine a first distance from the BS to the target based on a timing of the first sensing signal and the reflection of the first sensing signal; determine a second distance from the BS to the target based on a timing of the second sensing signal and the reflection of the second sensing signal; and determine a position of the target based on a distance from the BS to the RIS, the first distance from the BS to the target, and the second distance from the BS to the target.

Clause 35. A base station (BS), comprising: a memory; at least one transceiver; and at least one processor communicatively coupled to the memory and the at least one transceiver, the at least one processor configured to: receive, via the at least one transceiver, a first signal comprising a reflection of a sensing signal from a second BS off of a reconfigurable intelligent surface (RIS); receive, via the at least one transceiver, a second signal comprising a reflection of the sensing signal from the second BS off of the RIS and off of a target; and perform bi-static sensing using the first signal and the second signal.

Clause 36. The BS of clause 35, wherein, to perform bi-static sensing using the first signal and the second signal, the at least one processor is configured to: determine a distance from the target to the BS based on a timing of the first signal, a timing of the second signal, a distance from the RIS to the BS, an angle of arrival (AoA) of the first signal, and an AoA of the second signal.

Clause 37. The BS of clause 36, wherein the at least one processor is further configured to determine a position of the target based on the distance from the target to the BS and the AoA of the second signal.

Clause 38. The BS of any of clauses 35 to 37, wherein, to perform bi-static sensing using the first signal and the second signal, the at least one processor is configured to: send, to the second BS via the at least one transceiver, information indicating a timing of the first signal, a timing of the second signal, and an AoA of the second signal; and receive, from the second BS via the at least one transceiver, information indicating a position of the target.

Clause 39. The BS of any of clauses 35 to 38, wherein, to perform bi-static sensing using the first signal and the second signal, the at least one processor is configured to: send, to the second BS via the at least one transceiver, information indicating a timing of the first signal, a timing of the second signal, a distance from the RIS to the BS, an angle of arrival (AoA) of the first signal, and an AoA of the second signal; and receive, from the second BS via the at least one transceiver, information indicating a position of the target.

Clause 40. A base station (BS), comprising: a memory; at least one transceiver; and at least one processor communicatively coupled to the memory and the at least one transceiver, the at least one processor configured to: receive, via the at least one transceiver, a first signal comprising a first sensing signal from a second BS; receive, via the at least one transceiver, a second signal comprising a reflection of the first sensing signal off of a target; receive, via the at least one transceiver, a third signal comprising a reflection of a second sensing signal from the second BS off of a reconfigurable intelligent surface (RIS); receive, via the at least one transceiver, a fourth signal comprising a reflection of the second sensing signal off of the RIS and off of the target; and perform bi-static sensing using the first signal, the second signal, the third signal, and the fourth signal.

Clause 41. The BS of clause 40, comprising sending, to the RIS via the at least one transceiver, configuration information that configures when the RIS is in an active state and when the RIS is in an inactive state.

Clause 42. The BS of clause 41, wherein receiving the first signal and receiving the second signal occurs while the RIS is in the inactive state.

Clause 43. The BS of any of clauses 41 to 42, wherein receiving the third signal and receiving the fourth signal occurs while the RIS is in the active state.

Clause 44. The BS of any of clauses 41 to 43, wherein, to perform bi-static sensing using the first signal, the second signal, the third signal, and the fourth signal, the at least one processor is configured to determine a distance from the BS to the target based on: a timing of the first signal, a timing of the second signal, a distance from the RIS to the BS, an angle of arrival (AoA) of the first signal, and an AoA of the second signal; a timing of the third signal, a timing of the fourth signal, a distance from the RIS to the BS, an AoA of the third signal, and an AoA of the fourth signal; or a combination thereof.

Clause 45. An apparatus comprising a memory, a transceiver, and a processor communicatively coupled to the memory and the transceiver, the memory, the transceiver, and the processor configured to perform a method according to any of clauses 1 to 22.

Clause 46. An apparatus comprising means for performing a method according to any of clauses 1 to 22.

Clause 47. A non-transitory computer-readable medium storing computer-executable instructions, the computer-executable comprising at least one instruction for causing a computer or processor to perform a method according to any of clauses 1 to 22.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method, performed by a base station (BS), of reconfigurable intelligent surface (RIS)-assisted sensing, the method comprising:
    configuring one or more reciprocal RIS beam pairs for sensing, wherein each of the one or more reciprocal RIS beam pairs comprises a downlink (DL) beam having a DL angle of departure (DL AoD) from a RIS controlled by a first set of control voltages and an uplink (UL) beam having an UL AoD from the RIS controlled by a second set of control voltages;
    sending, to the RIS, information identifying the one or more reciprocal RIS beam pairs; and
    performing monostatic sensing using at least one of the one or more reciprocal RIS beam pairs, wherein performing monostatic sensing comprises:
    sending, to the RIS, a sensing signal; and
    receiving, from the RIS, a reflection of the sensing signal from a target.

2. The method of claim 1, wherein sending the information identifying the one or more reciprocal RIS beam pairs comprises sending information mapping sensing slots to reciprocal RIS beam pairs.

3. The method of claim 2, wherein sending the information identifying the one or more reciprocal RIS beam pairs comprises sending information mapping sensing slots to reciprocal RIS beam pairs in a semi-static or dynamic manner.

4. The method of claim 1, wherein, for each of the one or more reciprocal RIS beam pairs, the first set of control voltages for the DL beam and the second set of control voltages for the UL beam are the same.

5. The method of claim 1, wherein, for each of the one or more reciprocal RIS beam pairs, the first set of control voltages are used by a first panel of the RIS for reflecting the DL beam and wherein the second set of control voltages are used by a second panel of the RIS for reflecting the UL beam.

6. The method of claim 1, wherein performing monostatic sensing further comprises:
    determining a distance from the RIS to the target based on the sensing signal, the reflection of the sensing signal, and a position of the RIS relative to the BS.

7. The method of claim 6, further comprising determining a position of the target based on the distance from the RIS to the target and the DL AoD from the RIS.

8. A method, performed by a base station (BS), of reconfigurable intelligent surface (RIS)-assisted sensing, the method comprising:
    sending, to a RIS, configuration information to configure when the RIS is in an active state and when the RIS is in an inactive state;
    sending a first sensing signal;
    receiving a reflection of the first sensing signal from a target;
    sending, to a RIS, a second sensing signal;
    receiving, from the RIS, a reflection of the second sensing signal from the target; and
    performing monostatic sensing using the first sensing signal, the reflection of the first sensing signal, the second sensing signal, and the reflection of the second sensing signal,
    wherein sending the first sensing signal and receiving the reflection of the first sensing signal are performed while the RIS is in the inactive state.

9. The method of claim 8, wherein sending the second sensing signal and receiving the reflection of the second sensing signal is performed while the RIS is in the active state.

10. The method of claim 8, wherein performing monostatic sensing using the first sensing signal, the reflection of the first sensing signal, the second sensing signal, and the reflection of the second sensing signal comprises:
    determining a first distance from the BS to the target based on a timing of the first sensing signal and the reflection of the first sensing signal;
    determining a second distance from the BS to the target based on a timing of the second sensing signal and the reflection of the second sensing signal; and
    determining a position of the target based on a distance from the BS to the RIS, the first distance from the BS to the target, and the second distance from the BS to the target.

11. A method of reconfigurable intelligent surface (RIS)-assisted sensing, the method comprising:
    receiving, at a base station (BS), a first signal comprising a reflection of a sensing signal from a second BS off of a RIS;
    receiving, at the BS, a second signal comprising a reflection of the sensing signal from the second BS off of the RIS and off of a target; and
    performing bi-static sensing using the first signal and the second signal, wherein receiving the first signal is performed while the RIS is in an inactive state.

12. The method of claim 11, wherein performing bi-static sensing using the first signal and the second signal comprises:
   determining a distance from the target to the BS based on a timing of the first signal, a timing of the second signal, a distance from the RIS to the BS, an angle of arrival (AoA) of the first signal, and an AoA of the second signal.

13. The method of claim 12, further comprising determining a position of the target based on the distance from the target to the BS and the AoA of the second signal.

14. The method of claim 11, wherein performing bi-static sensing using the first signal and the second signal comprises:
   sending, to the second BS, information indicating a timing of the first signal, a timing of the second signal, and an AoA of the second signal; and
   receiving, from the second BS, information indicating a position of the target.

15. The method of claim 11, wherein performing bi-static sensing using the first signal and the second signal comprises:
   sending, to the second BS, information indicating a timing of the first signal, a timing of the second signal, a distance from the RIS to the BS, an angle of arrival (AoA) of the first signal, and an AoA of the second signal; and
   receiving, from the second BS, information indicating a position of the target.

16. A method of reconfigurable intelligent surface (RIS)-assisted sensing, the method comprising:
   sending, to the RIS, configuration information that configures when the RIS is in an active state and when the RIS is in an inactive state;
   receiving, at a base station (BS), a first signal comprising a first sensing signal from a second BS;
   receiving, at the BS, a second signal comprising a reflection of the first sensing signal off of a target;
   receiving, at the BS, a third signal comprising a reflection of a second sensing signal from the second BS off of a RIS;
   receiving, at the BS, a fourth signal comprising a reflection of the second sensing signal off of the RIS and off of the target; and
   performing bi-static sensing using the first signal, the second signal, the third signal, and the fourth signal, wherein receiving the first signal and receiving the second signal occur while the RIS is in the inactive state.

17. The method of claim 16, wherein receiving the third signal and receiving the fourth signal occurs while the RIS is in the active state.

18. The method of claim 16, wherein performing bi-static sensing using the first signal, the second signal, the third signal, and the fourth signal comprises determining a distance from the BS to the target based on:
   a timing of the first signal, a timing of the second signal, a distance from the RIS to the BS, an angle of arrival (AoA) of the first signal, and an AoA of the second signal;
   a timing of the third signal, a timing of the fourth signal, a distance from the RIS to the BS, an AoA of the third signal, and an AoA of the fourth signal; or
   a combination thereof.

19. A base station (BS), comprising:
   a memory;
   at least one transceiver; and
   at least one processor communicatively coupled to the memory and the at least one transceiver, the at least one processor configured to:
      configure one or more reciprocal reconfigurable intelligent surface (RIS) beam pairs for sensing, wherein each of the one or more reciprocal RIS beam pairs comprises a downlink (DL) beam having a DL angle of departure (DL AoD) from a RIS controlled by a first set of control voltages and an uplink (UL) beam having an UL AoD from the RIS controlled by a second set of control voltages;
      send, to the RIS via the at least one transceiver, information identifying the one or more reciprocal RIS beam pairs; and
      perform monostatic sensing using at least one of the one or more reciprocal RIS beam pairs, wherein, to perform monostatic sensing, the at least one processor is configured to:
         send, to the RIS via the at least one transceiver, a sensing signal; and
         receive, from the RIS via the at least one transceiver, a reflection of the sensing signal from a target.

20. The BS of claim 19, wherein, to send the information identifying the one or more reciprocal RIS beam pairs, the at least one processor is configured to send information mapping sensing slots to reciprocal RIS beam pairs.

21. The BS of claim 20, wherein, to send the information identifying the one or more reciprocal RIS beam pairs, the at least one processor is configured to send information mapping sensing slots to reciprocal RIS beam pairs in a semi-static or dynamic manner.

22. The BS of claim 19, wherein, for each of the one or more reciprocal RIS beam pairs, the first set of control voltages for the DL beam and the second set of control voltages for the UL beam are the same.

23. The BS of claim 19, wherein, for each of the one or more reciprocal RIS beam pairs, the first set of control voltages are used by a first panel of the RIS for reflecting the DL beam and wherein the second set of control voltages are used by a second panel of the RIS for reflecting the UL beam.

24. The BS of claim 19, wherein, to perform monostatic sensing, the at least one processor is further configured to:
   determine a distance from the RIS to the target based on the sensing signal, the reflection of the sensing signal, and a position of the RIS relative to the BS.

25. The BS of claim 24, wherein the at least one processor is further configured to determine a position of the target based on the distance from the RIS to the target and the DL AoD from the RIS.

26. A base station (BS), comprising:
   a memory;
   at least one transceiver; and
   at least one processor communicatively coupled to the memory and the at least one transceiver, the at least one processor configured to:
      send, to a reconfigurable intelligent surface (RIS) via the at least one transceiver, configuration information to configure when the RIS is in an active state and when the RIS is in an inactive state,
      send, via the at least one transceiver, a first sensing signal;
      receive, via the at least one transceiver, a reflection of the first sensing signal from a target;
      send, to the RIS via the at least one transceiver, a second sensing signal;

receive, from the RIS via the at least one transceiver, a reflection of the second sensing signal from the target; and perform monostatic sensing using the first sensing signal, the reflection of the first sensing signal, the second sensing signal, and the reflection of the second sensing signal, wherein sending the first sensing signal and receiving the reflection of the first sensing signal is performed while the RIS is in the inactive state.

27. The BS of claim 26, wherein sending the second sensing signal and receiving the reflection of the second sensing signal is performed while the RIS is in the active state.

28. The BS of claim 26, wherein, to perform monostatic sensing using the first sensing signal, the reflection of the first sensing signal, the second sensing signal, and the reflection of the second sensing signal, the at least one processor is configured to:

determine a first distance from the BS to the target based on a timing of the first sensing signal and the reflection of the first sensing signal;

determine a second distance from the BS to the target based on a timing of the second sensing signal and the reflection of the second sensing signal; and determine a position of the target based on a distance from the BS to the RIS, the first distance from the BS to the target, and the second distance from the BS to the target.

29. A base station (BS), comprising:
a memory;
at least one transceiver; and
at least one processor communicatively coupled to the memory and the at least one transceiver, the at least one processor configured to:

receive, via the at least one transceiver, a first signal comprising a reflection of a sensing signal from a second BS off of a reconfigurable intelligent surface (RIS);

receive, via the at least one transceiver, a second signal comprising a reflection of the sensing signal from the second BS off of the RIS and off of a target; and perform bi-static sensing using the first signal and the second signal, wherein receiving the first signal is performed while the RIS is in an inactive state.

30. The BS of claim 29, wherein, to perform bi-static sensing using the first signal and the second signal, the at least one processor is configured to:

determine a distance from the target to the BS based on a timing of the first signal, a timing of the second signal, a distance from the RIS to the BS, an angle of arrival (AoA) of the first signal, and an AoA of the second signal.

31. The BS of claim 30, wherein the at least one processor is further configured to determine a position of the target based on the distance from the target to the BS and the AoA of the second signal.

32. The BS of claim 29, wherein, to perform bi-static sensing using the first signal and the second signal, the at least one processor is configured to:

send, to the second BS via the at least one transceiver, information indicating a timing of the first signal, a timing of the second signal, and an AoA of the second signal; and receive, from the second BS via the at least one transceiver, information indicating a position of the target.

33. The BS of claim 29, wherein, to perform bi-static sensing using the first signal and the second signal, the at least one processor is configured to:

send, to the second BS via the at least one transceiver, information indicating a timing of the first signal, a timing of the second signal, a distance from the RIS to the BS, an angle of arrival (AoA) of the first signal, and an AoA of the second signal; and receive, from the second BS via the at least one transceiver, information indicating a position of the target.

34. A base station (BS), comprising:
a memory;
at least one transceiver; and
at least one processor communicatively coupled to the memory and the at least one transceiver, the at least one processor configured to:

receive, via the at least one transceiver, a first signal comprising a first sensing signal from a second BS;

receive, via the at least one transceiver, a second signal comprising a reflection of the first sensing signal off of a target;

receive, via the at least one transceiver, a third signal comprising a reflection of a second sensing signal from the second BS off of a reconfigurable intelligent surface (RIS);

receive, via the at least one transceiver, a fourth signal comprising a reflection of the second sensing signal off of the RIS and off of the target; and perform bi-static sensing using the first signal, the second signal, the third signal, and the fourth signal, wherein the at least one processor is further configured to send, to the RIS via the at least one transceiver, configuration information that configures when the RIS is in an active state and when the RIS is in an inactive state, wherein receiving the first signal and receiving the second signal occurs while the RIS is in the inactive state.

35. The BS of claim 34, wherein receiving the third signal and receiving the fourth signal occurs while the RIS is in the active state.

36. The BS of claim 34, wherein, to perform bi-static sensing using the first signal, the second signal, the third signal, and the fourth signal, the at least one processor is configured to determine a distance from the BS to the target based on:

a timing of the first signal, a timing of the second signal, a distance from the RIS to the BS, an angle of arrival (AoA) of the first signal, and an AoA of the second signal;

a timing of the third signal, a timing of the fourth signal, a distance from the RIS to the BS, an AoA of the third signal, and an AoA of the fourth signal; or a combination thereof.

* * * * *